(12) United States Patent
Savard

(10) Patent No.: US 11,992,928 B2
(45) Date of Patent: May 28, 2024

(54) TOOL WITH ARTICULATED HANDLE

(71) Applicant: Normand Savard, Drummondville (CA)

(72) Inventor: Normand Savard, Drummondville (CA)

(73) Assignee: Normand Savard, Drummondville (CA)

( * ) Notice: Subject to any disclaimer, the term of this patent is extended or adjusted under 35 U.S.C. 154(b) by 893 days.

(21) Appl. No.: 17/060,978

(22) Filed: Oct. 1, 2020

(65) Prior Publication Data

US 2021/0016429 A1     Jan. 21, 2021

Related U.S. Application Data

(63) Continuation of application No. PCT/CA2019/050871, filed on Jun. 21, 2019.

(30) Foreign Application Priority Data

Jun. 22, 2018   (CA) .................................. CA 3009220

(51) Int. Cl.
    *B25G 1/04*           (2006.01)
    *A46B 5/00*           (2006.01)
                 (Continued)

(52) U.S. Cl.
    CPC .............. *B25G 1/04* (2013.01); *A46B 5/0045* (2013.01); *A46B 5/005* (2013.01);
                 (Continued)

(58) Field of Classification Search
    CPC ........ B25G 1/04; B25G 3/38; A46B 15/0055; A46B 2200/302; A46B 2200/3046; A46B 5/0045; A46B 5/005; A47L 1/06
    See application file for complete search history.

(56) References Cited

U.S. PATENT DOCUMENTS

| | | |
|---|---|---|
| 1,036,222 A | 8/1912 | Griffenberg |
| 1,059,054 A | 4/1913 | Lindelien |
| | (Continued) | |

FOREIGN PATENT DOCUMENTS

| | | | |
|---|---|---|---|
| CA | 2622520 C | 1/2010 | |
| CA | 3091432 A1 * | 8/2019 | ........... A46B 5/0041 |
| | (Continued) | | |

OTHER PUBLICATIONS

Machine translation in English of CN2149797.
(Continued)

*Primary Examiner* — Shay Karls
(74) *Attorney, Agent, or Firm* — Fasken Martineau Dumoulin

(57) ABSTRACT

The tool has a folded position and an unfolded position. It will generally include a head assembly and an articulated handle. The handle can also be used alone. The handle, or the tool with such handle, occupies only a very compact space once in a fully folded position. It may thus be easily carried and stored when not in use. It can be folded and unfolded with only a minimal manipulative effort and level of difficulty. The main constituent parts cannot become detached and this unitary design alleviates the risks of parts being misplaced or lost.

20 Claims, 35 Drawing Sheets

(51) Int. Cl.
*A46B 15/00* (2006.01)
*A47L 1/06* (2006.01)
*A47L 13/11* (2006.01)
*A47L 13/12* (2006.01)
*B25G 1/06* (2006.01)
*B25G 3/38* (2006.01)
*B60S 3/04* (2006.01)

(52) U.S. Cl.
CPC ............ *A46B 15/0055* (2013.01); *A47L 1/06* (2013.01); *A47L 13/11* (2013.01); *A47L 13/12* (2013.01); *B25G 1/06* (2013.01); *B25G 3/38* (2013.01); *B60S 3/045* (2013.01); *A46B 2200/3046* (2013.01)

(56) References Cited

U.S. PATENT DOCUMENTS

| | | | |
|---|---|---|---|
| 1,192,174 A | 7/1916 | Dvorak | |
| 1,538,995 A | 5/1925 | Lakatos | |
| 1,798,163 A | 3/1931 | Krenzke | |
| 2,133,692 A | 10/1938 | Grittings et al. | |
| 2,724,610 A | 11/1955 | Fitzgerald | |
| 2,818,291 A | 12/1957 | Corns | |
| 3,017,649 A | 1/1962 | Racicot | |
| 3,177,000 A | 4/1965 | Alexander | |
| 3,221,805 A | 12/1965 | Miller | |
| 3,368,423 A | 2/1968 | Fazekas et al. | |
| 3,380,767 A | 4/1968 | Barth | |
| 3,518,833 A | 7/1970 | Bogart | |
| 3,520,496 A | 7/1970 | Wuenscher | |
| 3,643,292 A | 2/1972 | Mayer | |
| 3,655,297 A | 4/1972 | Bolen, Jr. et al. | |
| 4,041,564 A | 8/1977 | Schlicher | |
| 4,063,830 A | 12/1977 | Ban | |
| 4,082,186 A | 4/1978 | Chirumbolo | |
| 4,302,862 A | 12/1981 | Machacek et al. | |
| 4,393,541 A | 7/1983 | Hujsak et al. | |
| 4,532,674 A | 8/1985 | Tobey et al. | |
| 4,550,943 A | 11/1985 | Mirto | |
| 4,670,921 A | 6/1987 | Avni et al. | |
| 4,768,303 A | 9/1988 | Baylink | |
| 4,776,716 A | 10/1988 | Huang | |
| 4,908,900 A | 3/1990 | McLaughlin et al. | |
| D336,783 S | 6/1993 | Hopkins et al. | |
| 5,364,201 A | 11/1994 | Labarre | |
| 5,561,874 A | 10/1996 | Malofsky et al. | |
| 5,671,490 A | 9/1997 | Wu | |
| 5,682,641 A | 11/1997 | Newman, Jr. et al. | |
| 5,715,573 A | 2/1998 | Holemans | |
| 5,746,533 A * | 5/1998 | Schmidt ............. | E05D 11/1007 403/353 |
| 5,943,727 A | 8/1999 | Freer | |
| 5,966,992 A | 10/1999 | Kashuba | |
| 6,032,321 A | 3/2000 | Shirey et al. | |
| 6,088,868 A | 7/2000 | Cerveny | |
| 6,101,756 A | 8/2000 | Baker | |
| 6,142,527 A | 11/2000 | Lenhart | |
| 6,412,843 B1 | 7/2002 | Burbrink et al. | |
| 6,481,041 B1 | 11/2002 | Ingram | |
| 6,505,381 B1 | 1/2003 | Thomson et al. | |
| 6,565,069 B2 | 5/2003 | Morris | |
| 6,625,837 B2 | 9/2003 | Jiang | |
| 6,688,800 B2 | 2/2004 | Kresge | |
| 6,722,614 B2 | 4/2004 | Ozawa et al. | |
| 6,804,853 B2 | 10/2004 | Wang | |
| 6,854,919 B2 | 2/2005 | Neumann et al. | |
| 6,886,319 B2 | 5/2005 | Nam | |
| 7,003,849 B2 | 2/2006 | Cohen et al. | |
| 7,131,166 B2 | 11/2006 | Cohen et al. | |
| D542,035 S | 5/2007 | Barnes, Jr. et al. | |
| 7,299,614 B2 | 11/2007 | Sanders | |
| 7,340,801 B2 | 3/2008 | Yamaguchi | |
| 7,343,637 B2 | 3/2008 | Lafleur | |
| 7,445,231 B1 | 11/2008 | Tsai | |
| 7,458,115 B2 | 12/2008 | Chen et al. | |
| 7,617,559 B2 | 11/2009 | Jiang | |
| 7,617,560 B2 | 11/2009 | Argo et al. | |
| 7,677,619 B2 | 3/2010 | Hutchings et al. | |
| 8,584,993 B2 | 11/2013 | Pumford et al. | |
| 8,657,521 B2 | 2/2014 | Reeves | |
| 8,899,536 B2 | 12/2014 | Ashpole | |
| 9,078,547 B2 | 7/2015 | Cheng et al. | |
| 9,107,490 B2 | 8/2015 | Lafleur et al. | |
| 9,145,112 B1 | 9/2015 | Ihde | |
| 9,255,369 B2 | 2/2016 | Spataro et al. | |
| 9,345,314 B2 | 5/2016 | Henningsen | |
| 9,752,364 B2 * | 9/2017 | James ................. | E05D 11/1014 |
| 10,383,457 B2 | 8/2019 | Crumrine | |
| 2003/0102416 A1 | 6/2003 | Adams | |
| 2007/0151056 A1 | 7/2007 | Zhu et al. | |
| 2008/0256732 A1 | 10/2008 | Donatelli et al. | |
| 2010/0054852 A1 | 3/2010 | Snyder | |
| 2011/0176859 A1 | 7/2011 | Chu | |

FOREIGN PATENT DOCUMENTS

| | | |
|---|---|---|
| CN | 2149797 Y | 12/1993 |
| CN | 2551088 Y | 5/2003 |
| CN | 202728176 U | 2/2013 |
| CN | 202809548 U | 3/2013 |
| CN | 203623622 U | 6/2014 |
| DE | 202006006619 U1 | 6/2006 |
| FR | 2883903 B1 | 11/2008 |
| FR | 2893148 B1 | 6/2018 |
| WO | 2019241894 A1 | 12/2019 |

OTHER PUBLICATIONS

Machine translation in English of CN2551088.
Machine translation in English of CN202728176.
Machine translation in English of CN202809548.
Machine translation in English of CN203623622.
Machine translation in English of DE202006006619.
Machine translation in English of FR2883903.
Machine translation in English of FR2893148.

* cited by examiner

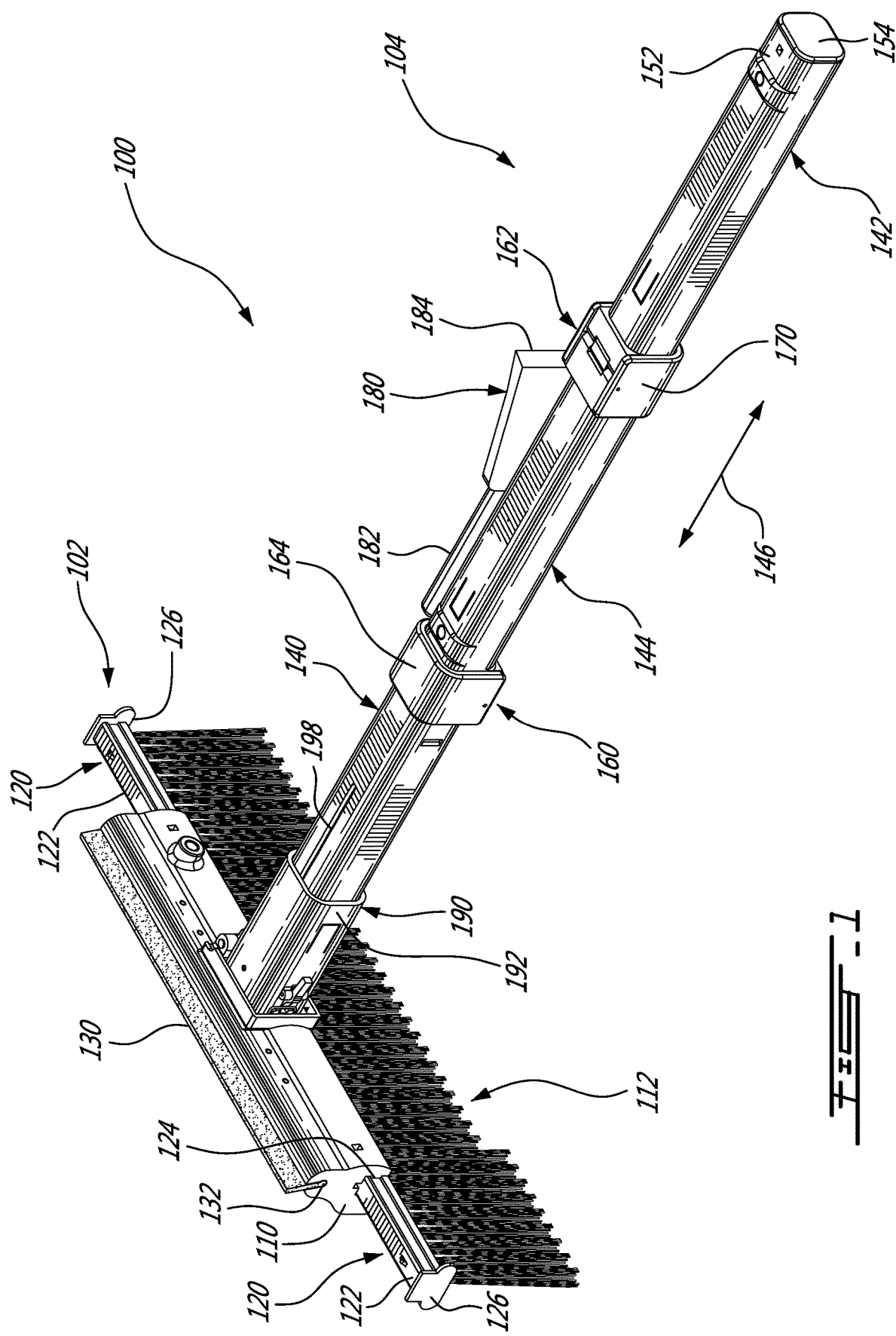

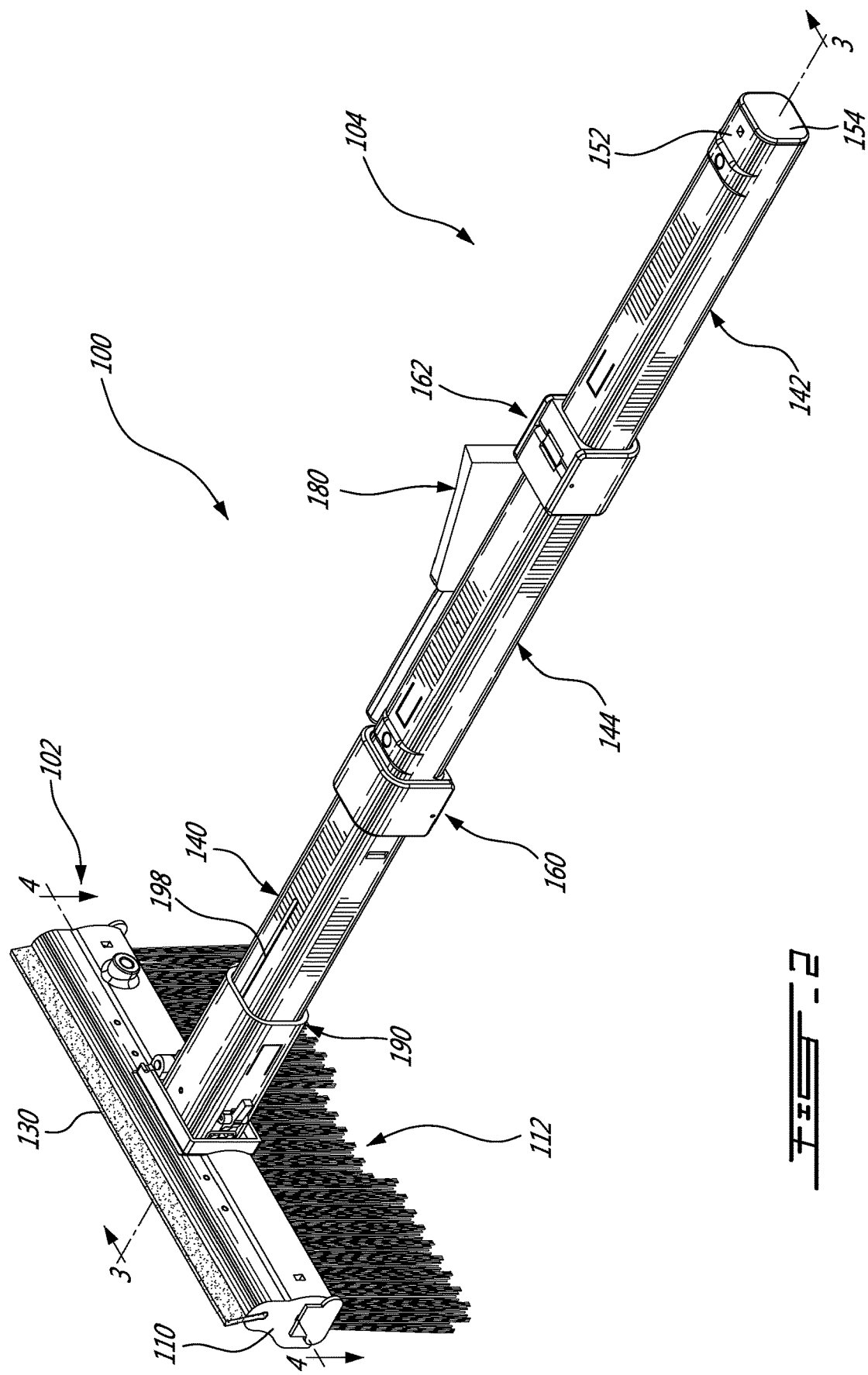

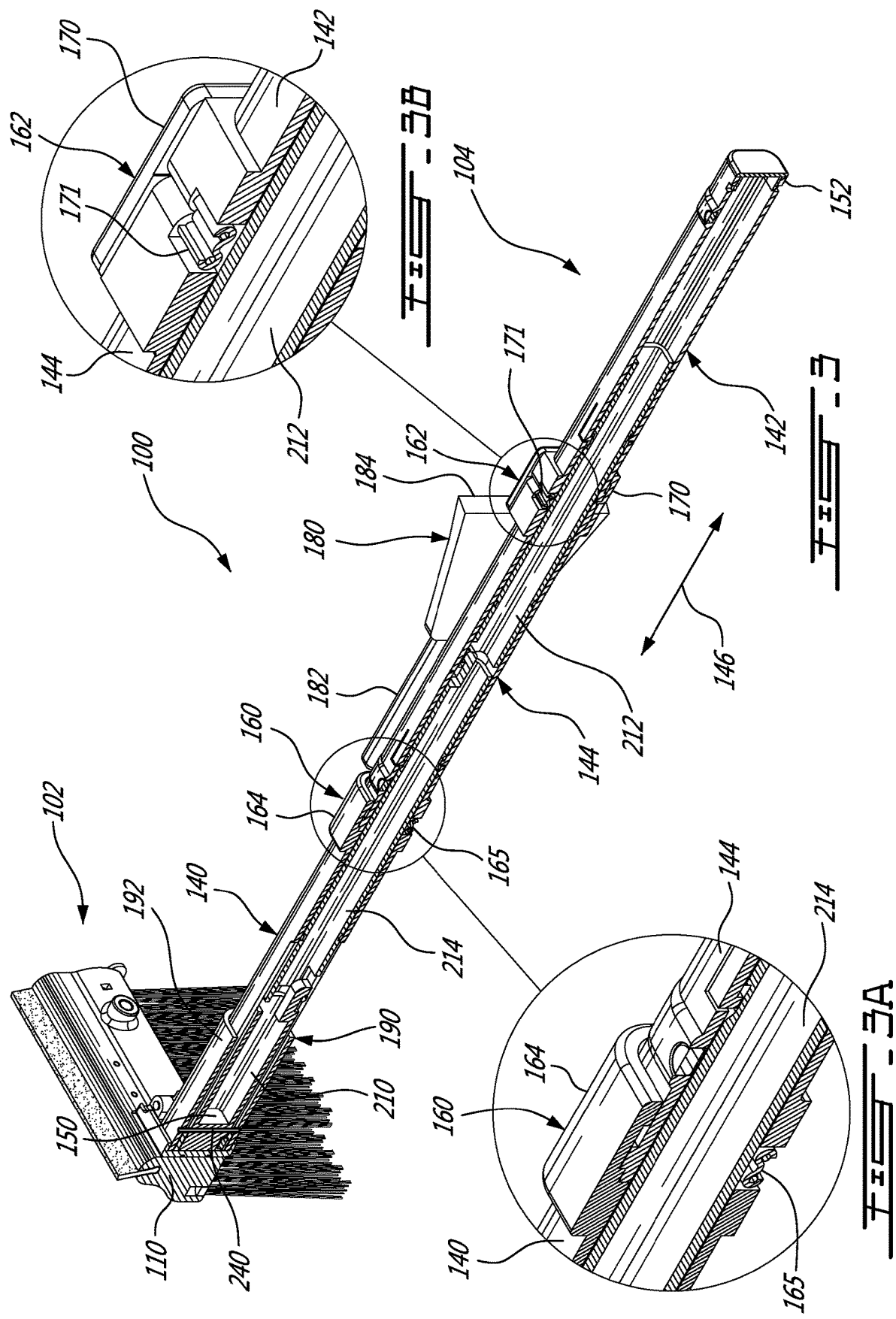

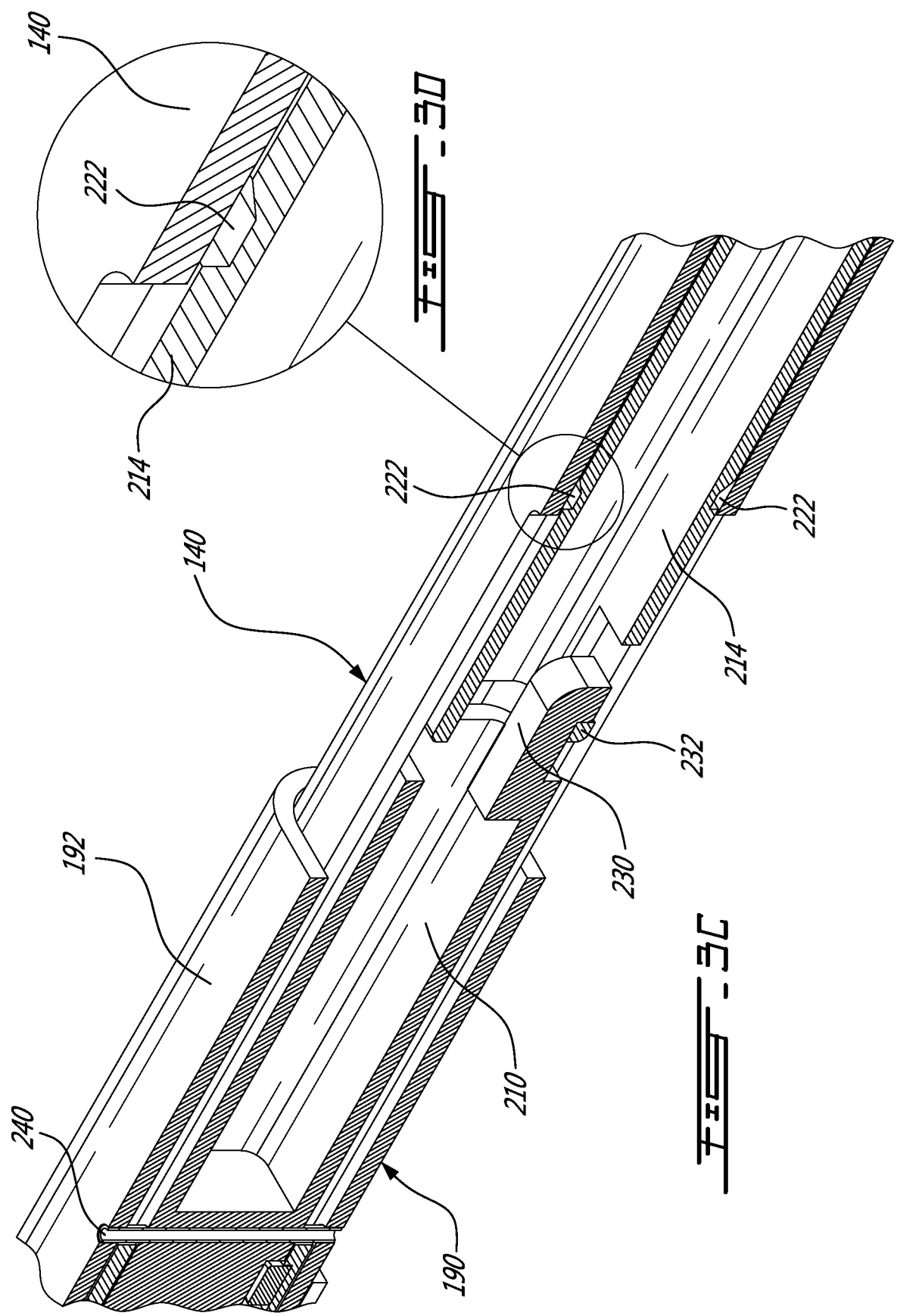

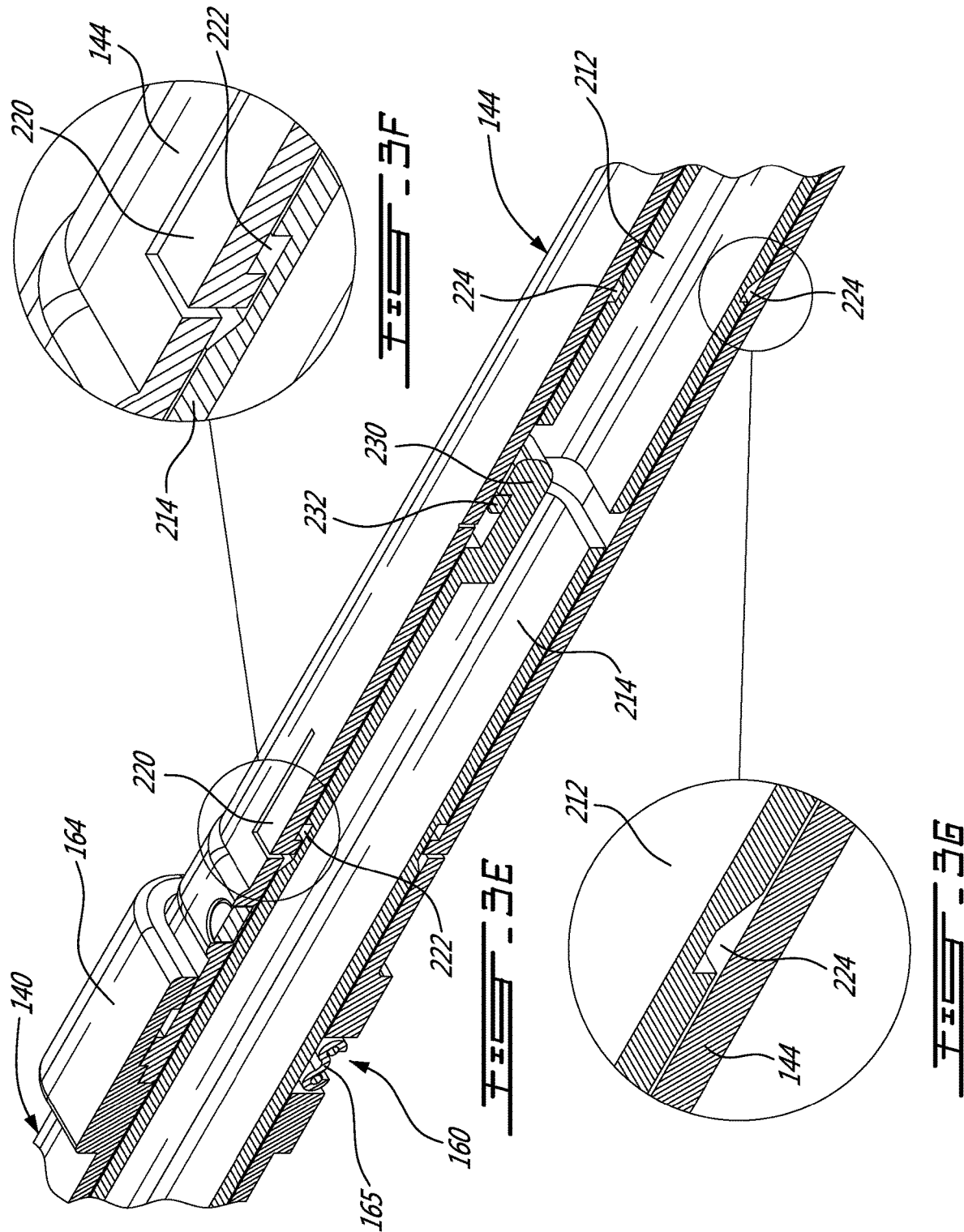

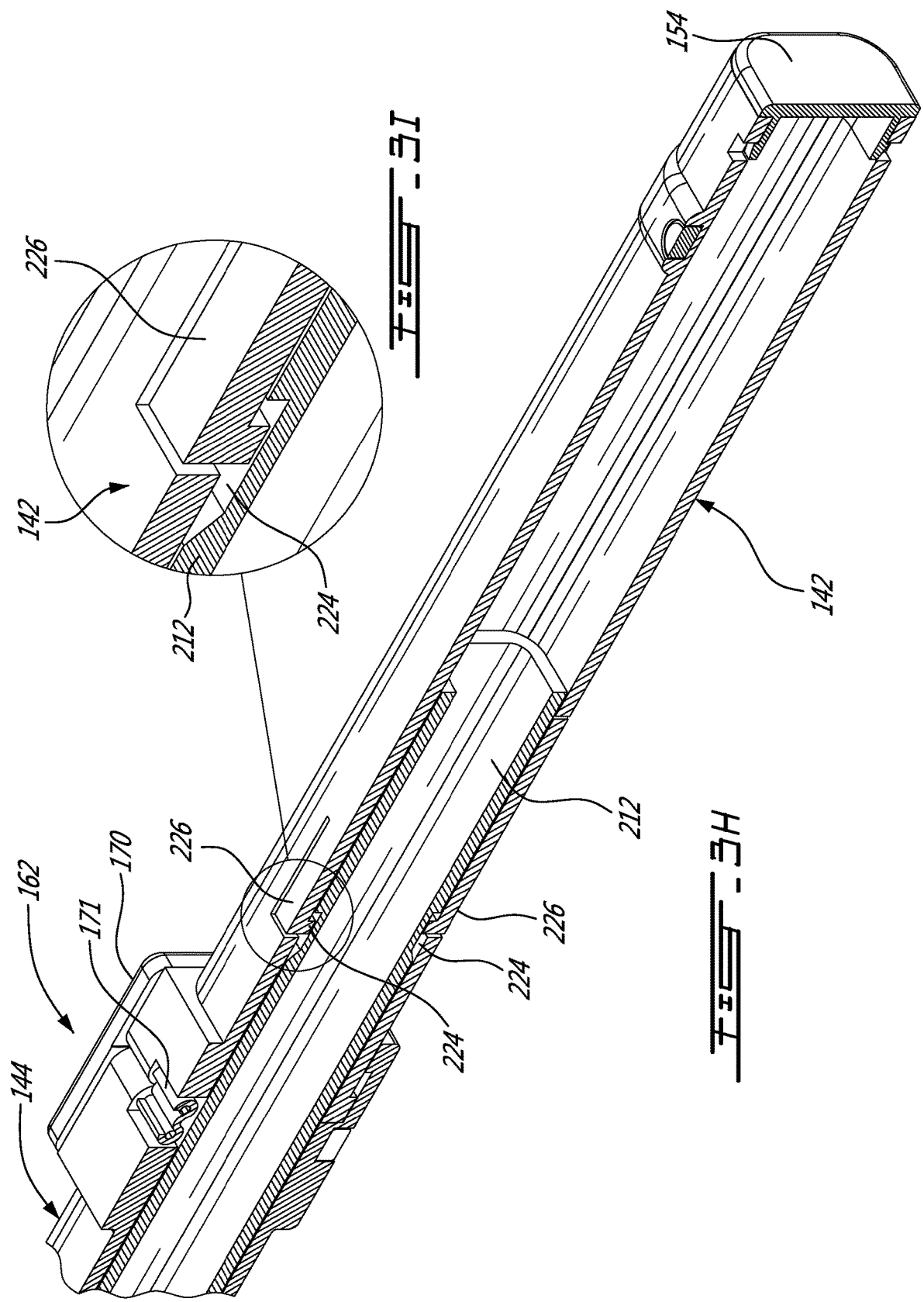

FIG-4
FIG-4A
FIG-4B

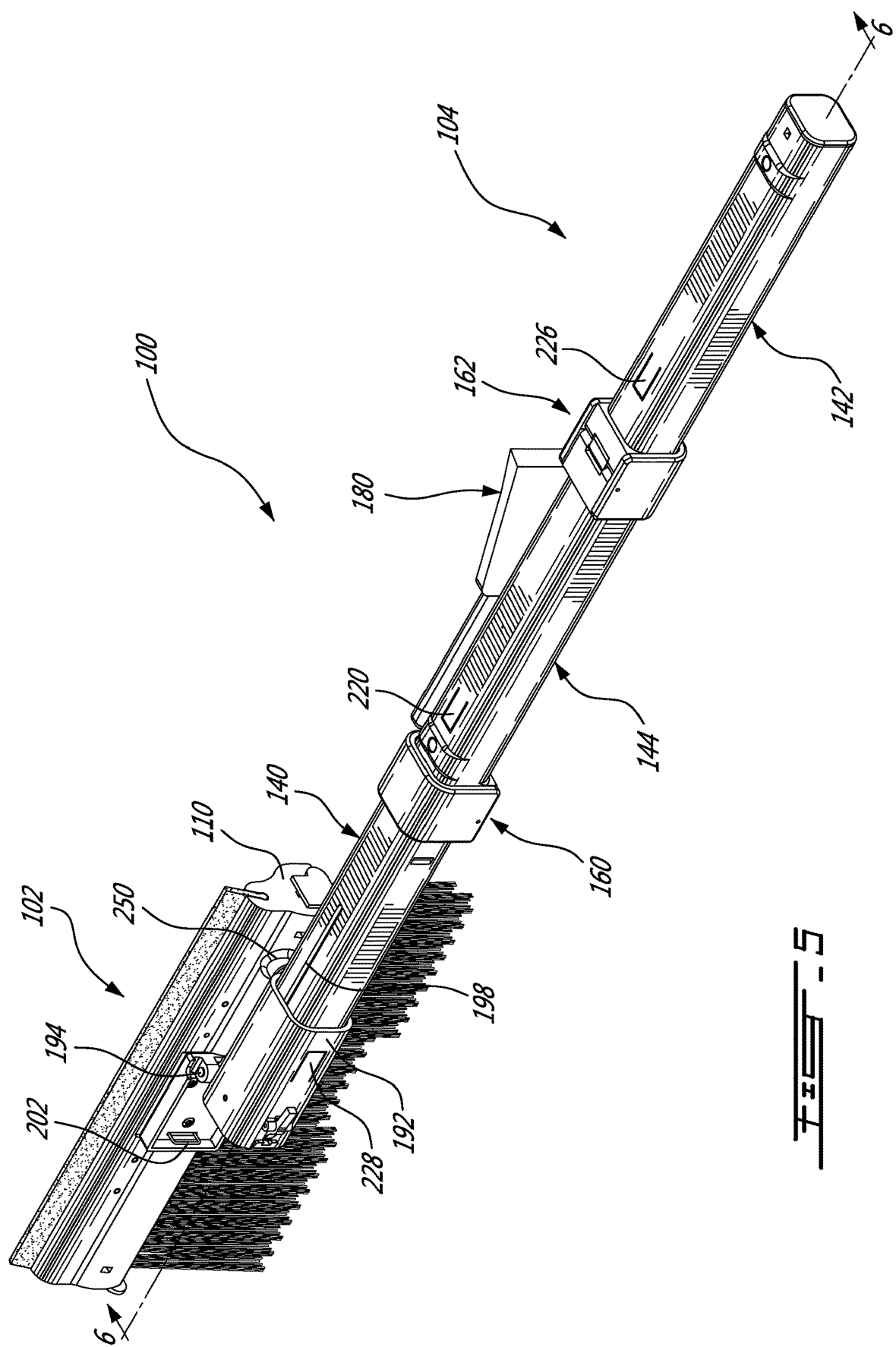

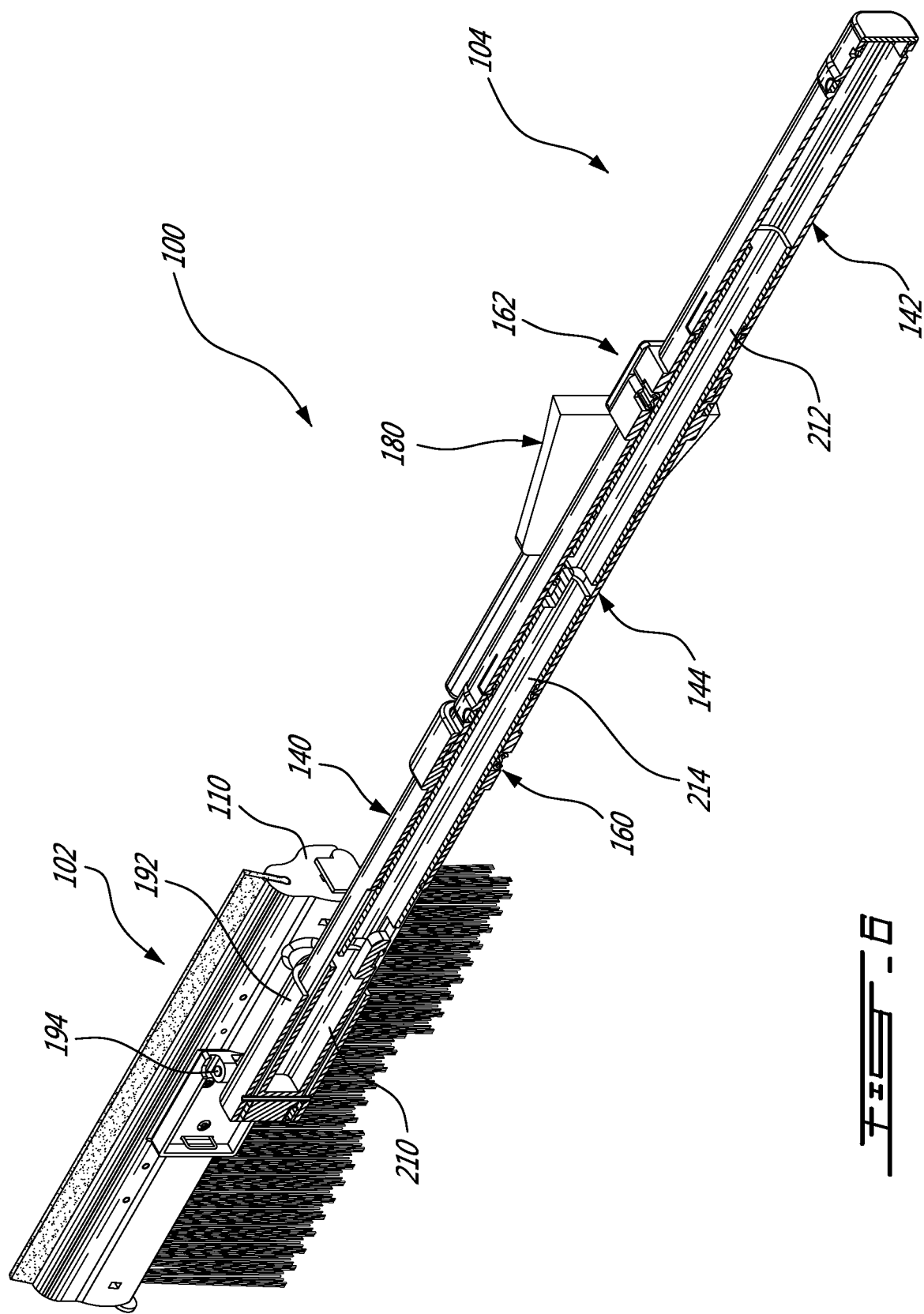

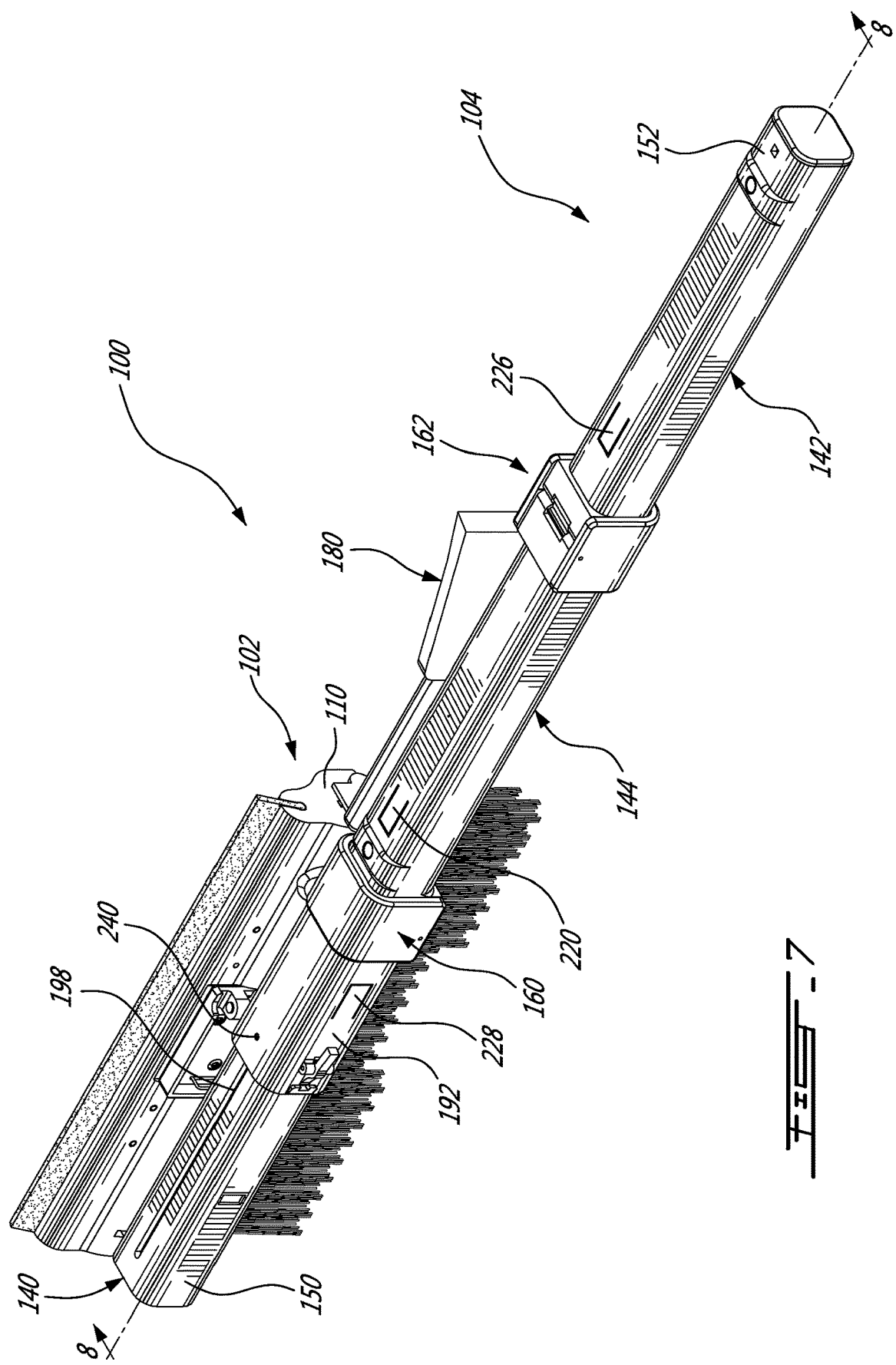

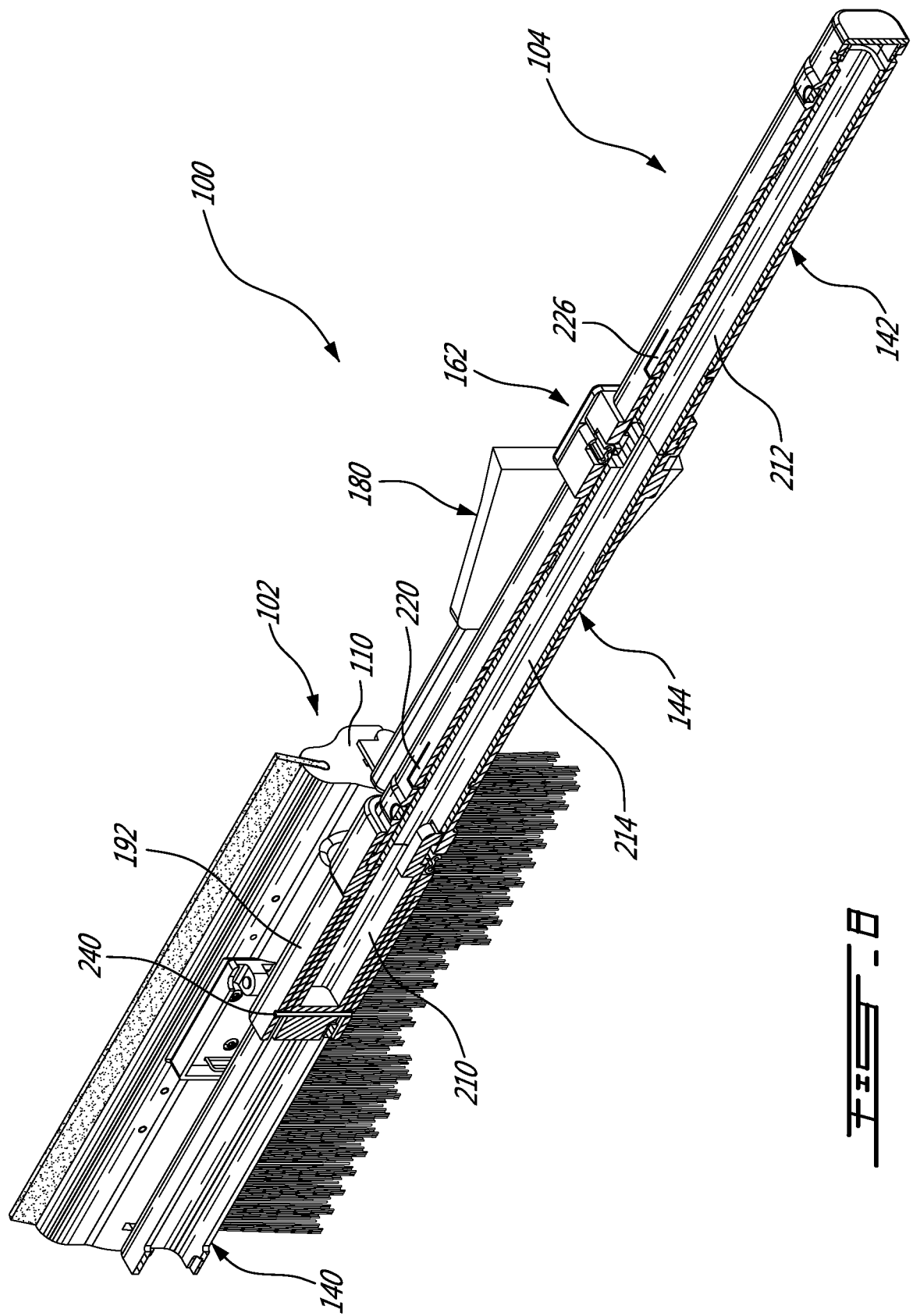

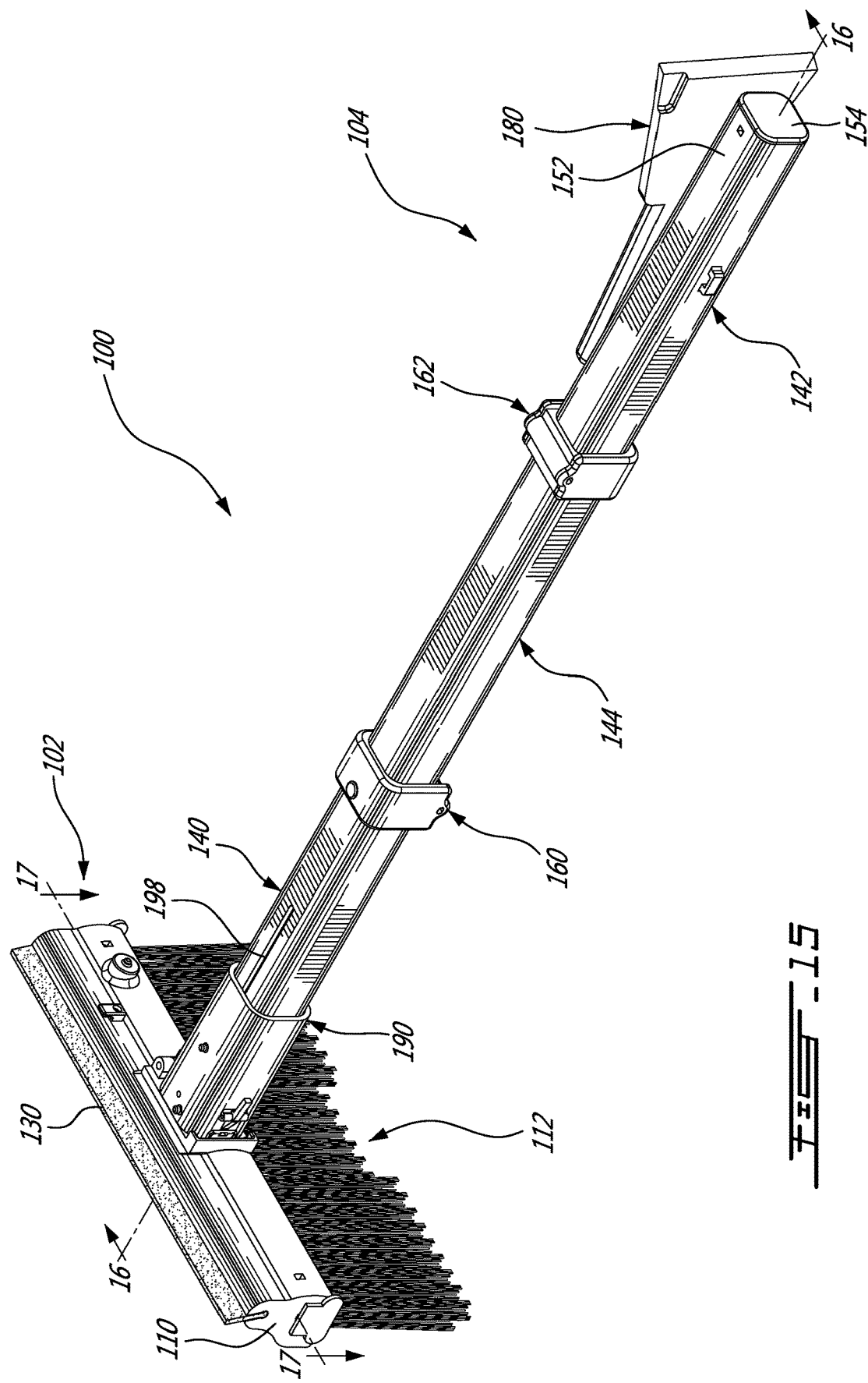

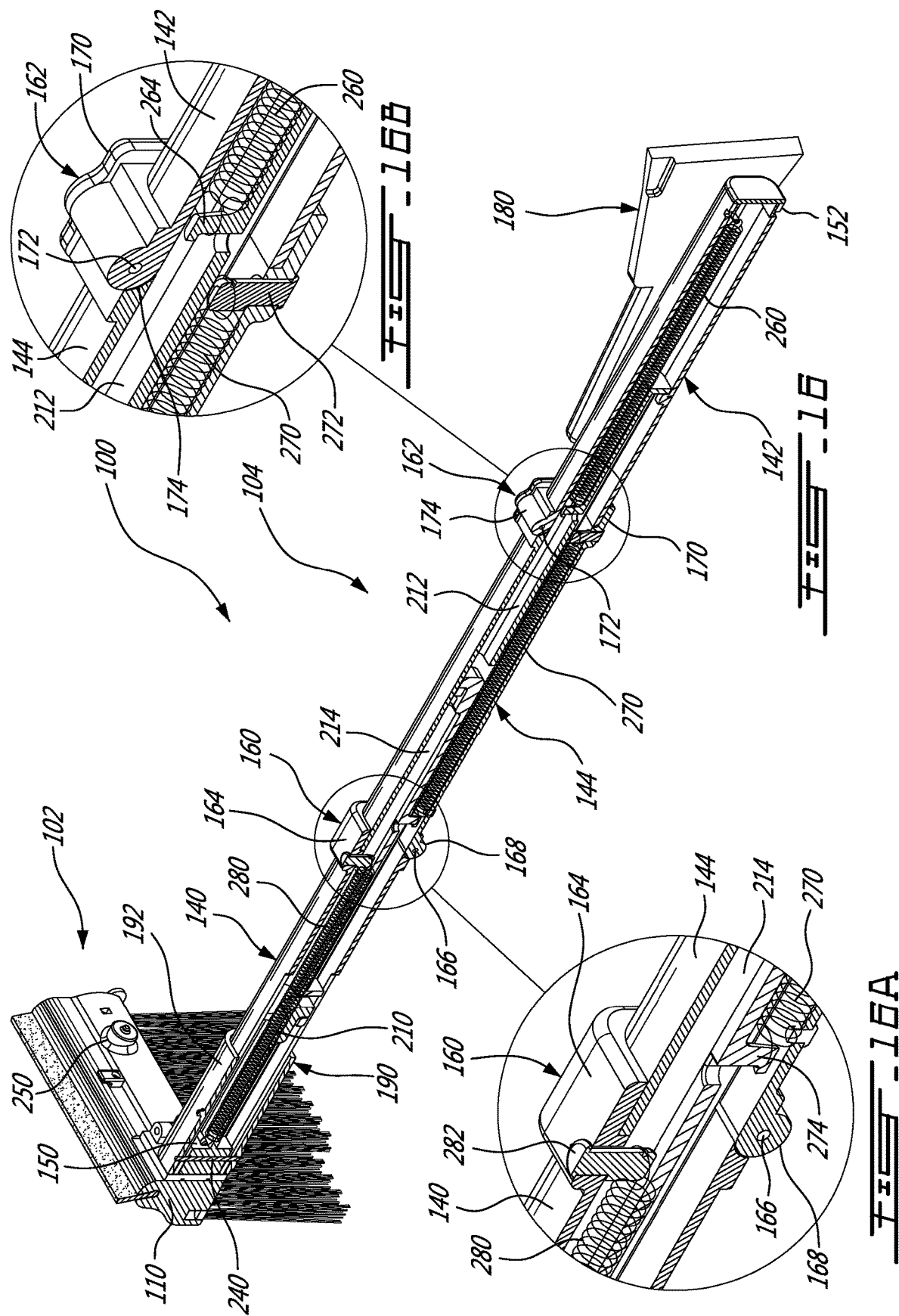

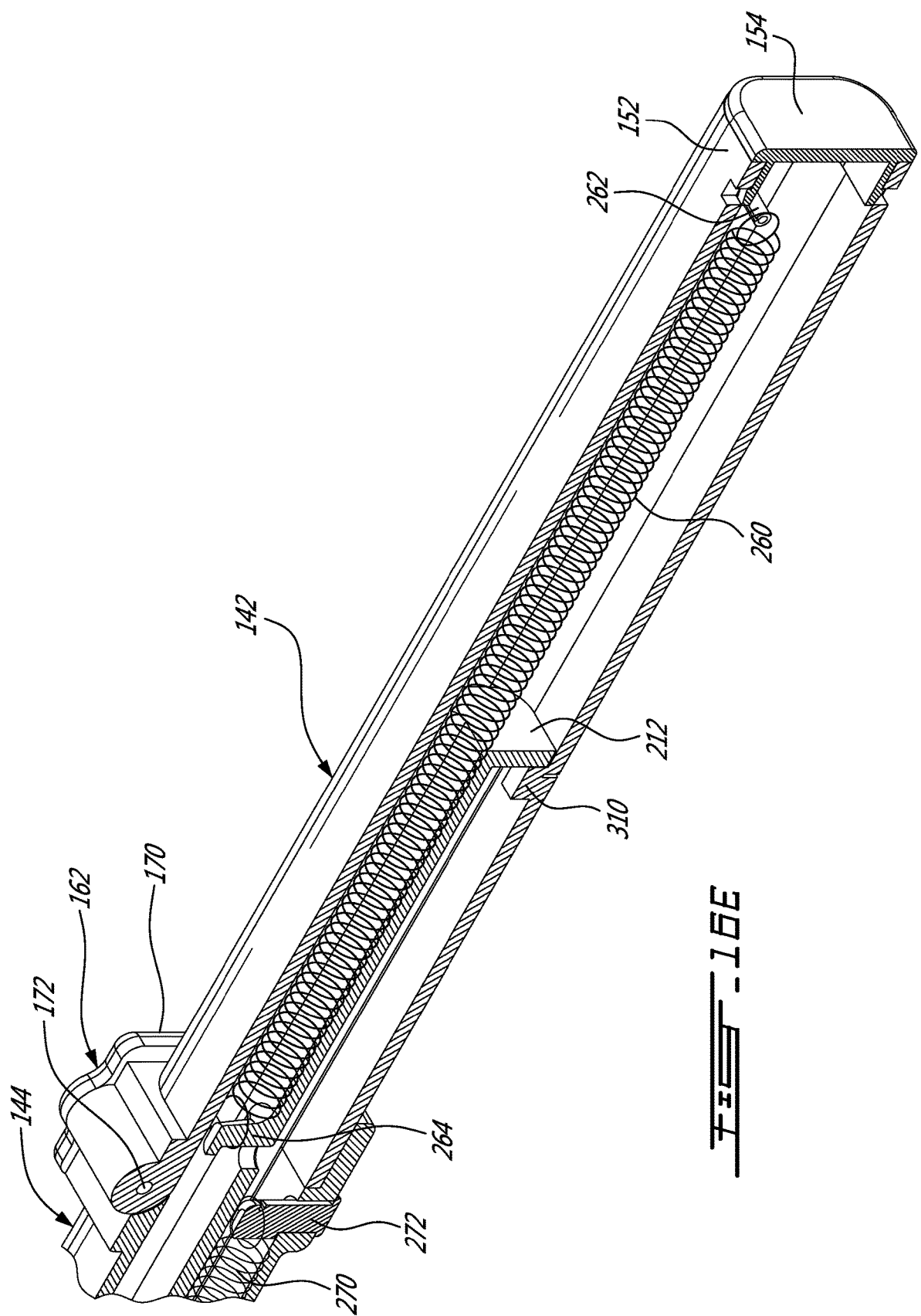

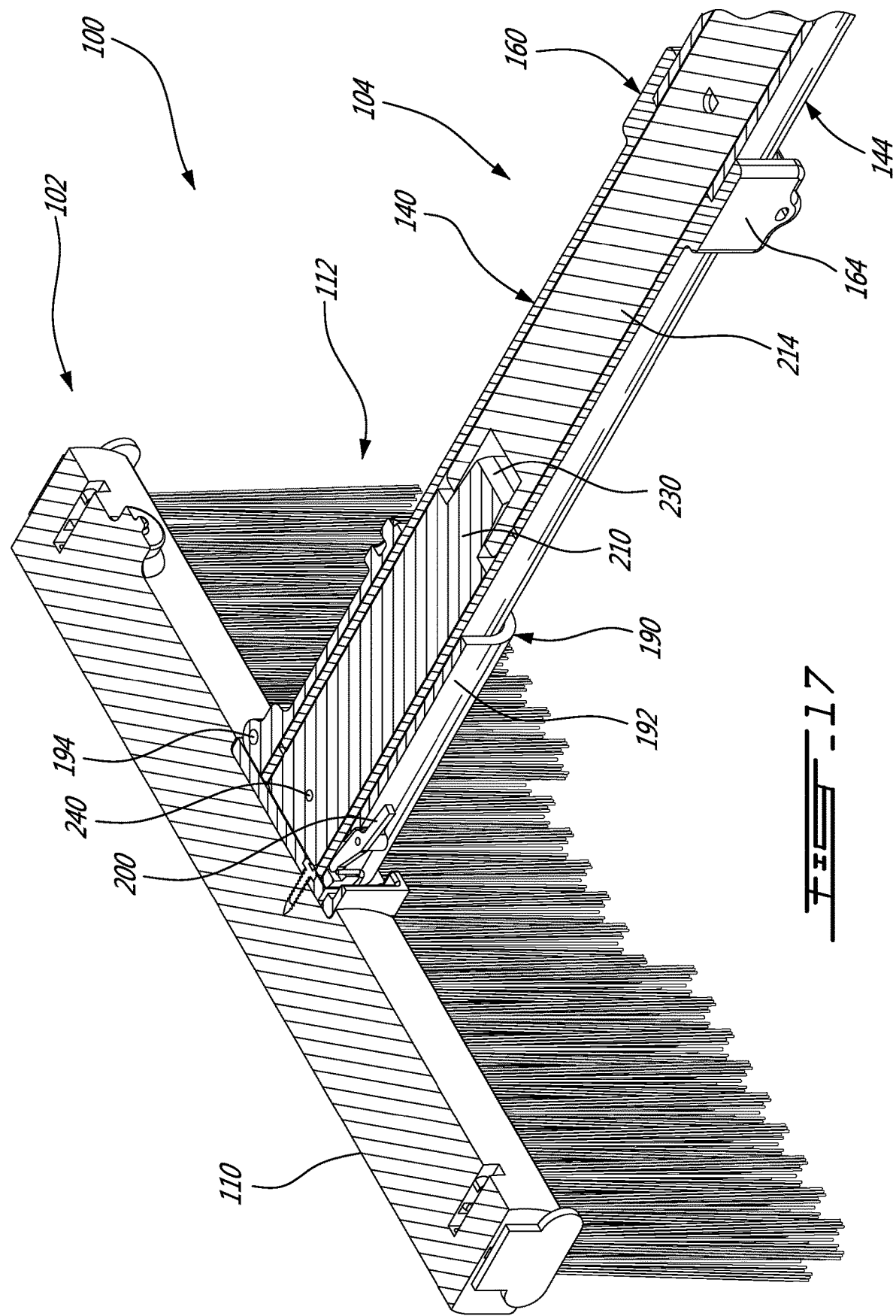

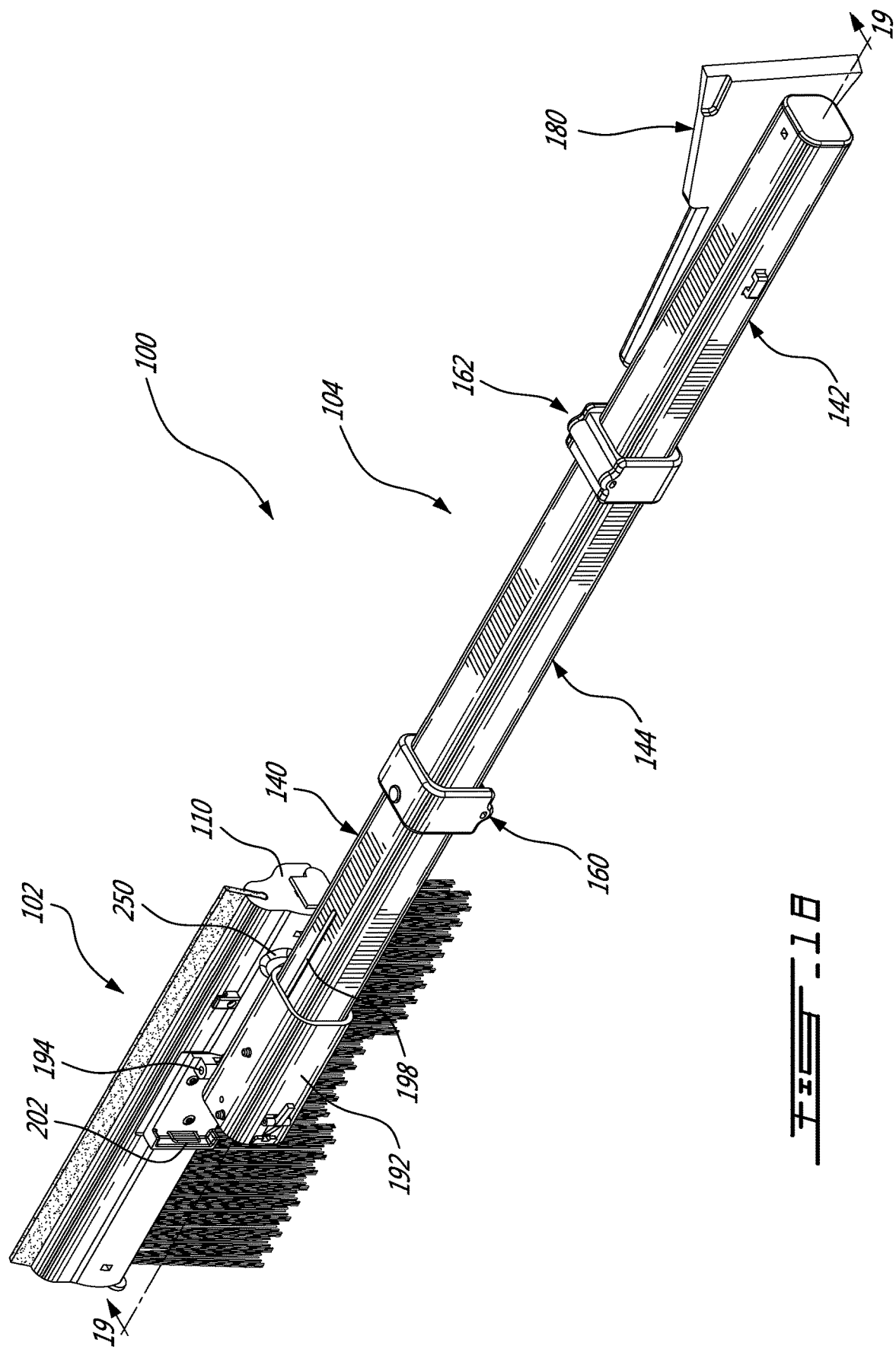

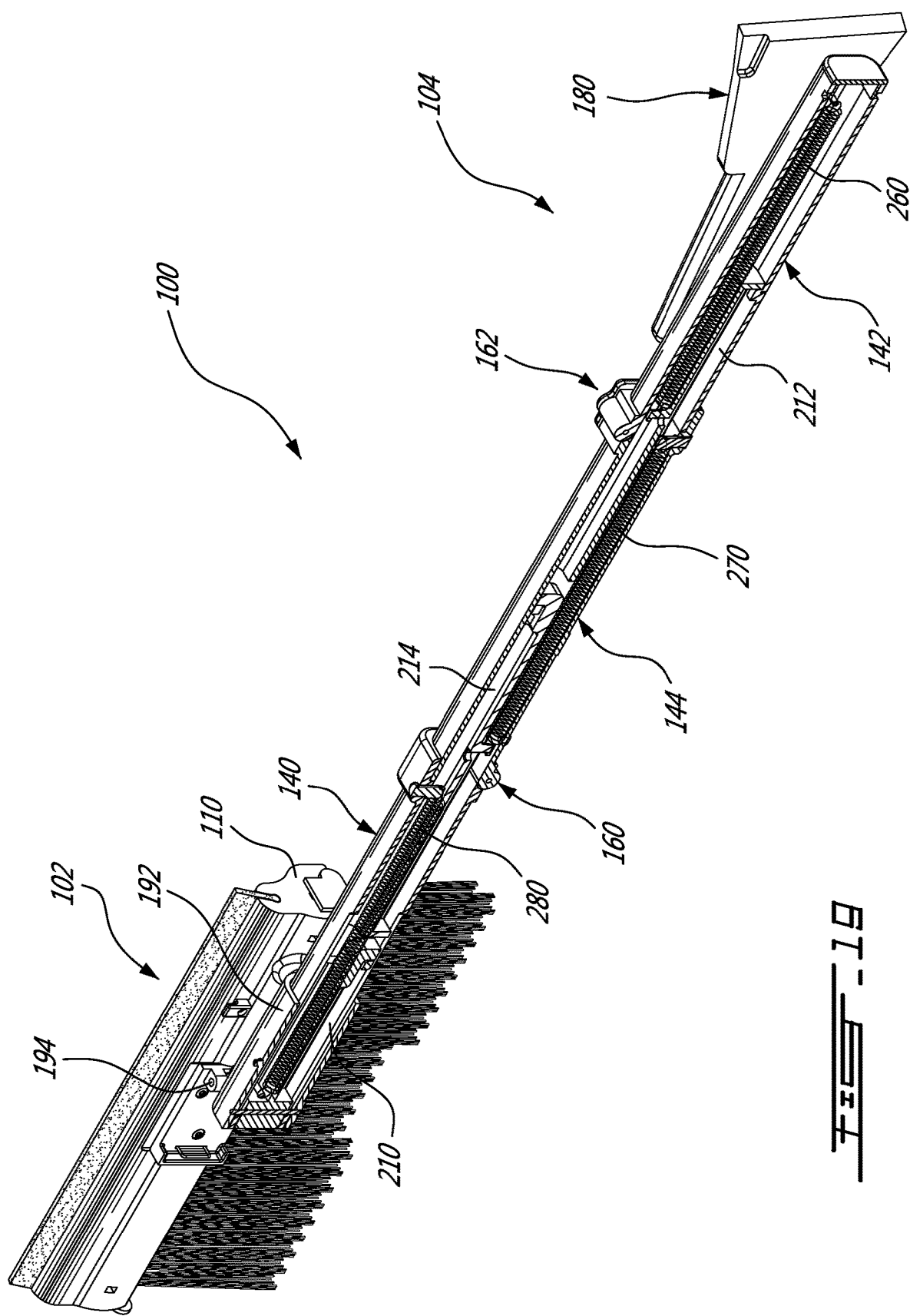

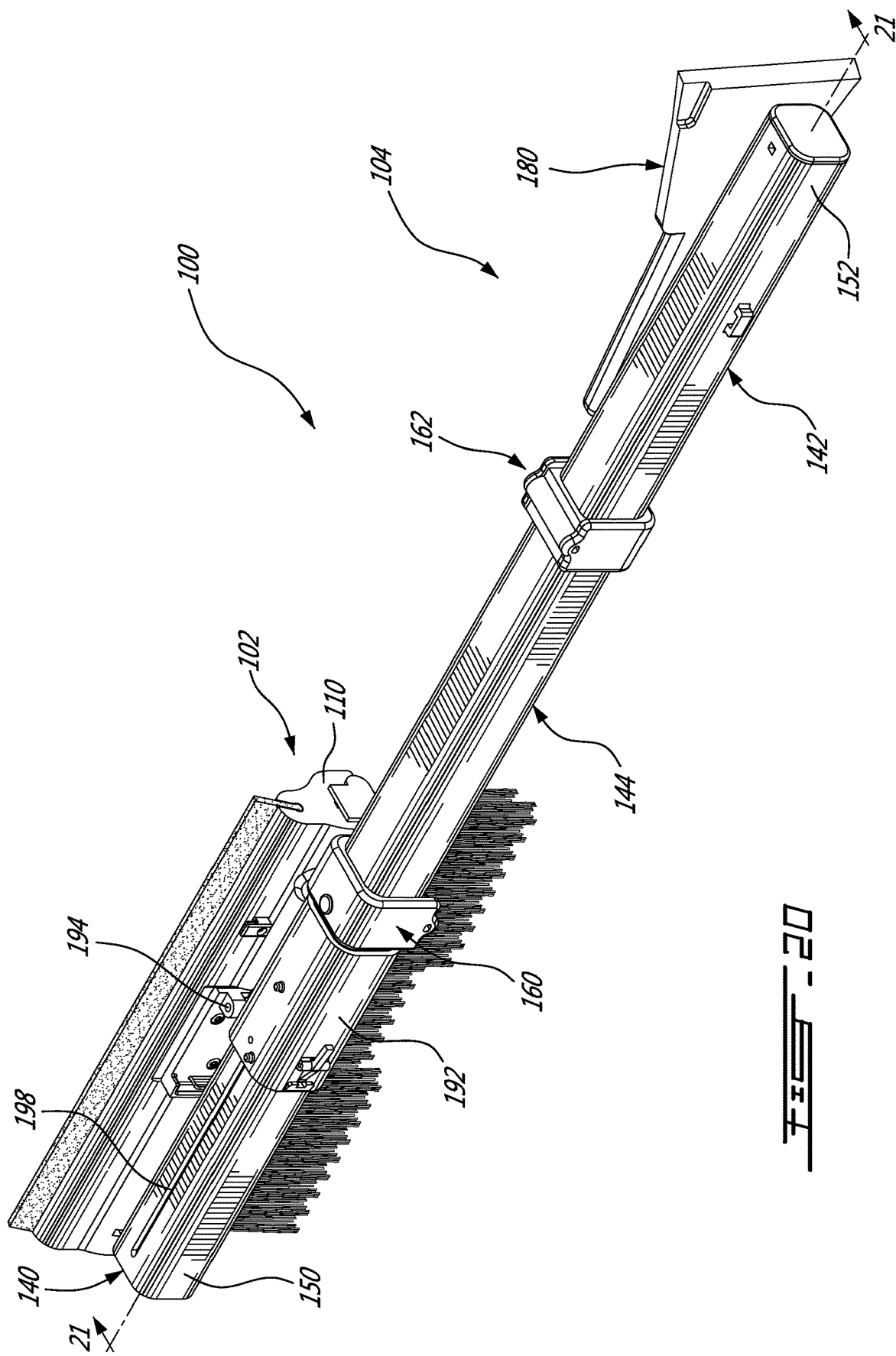

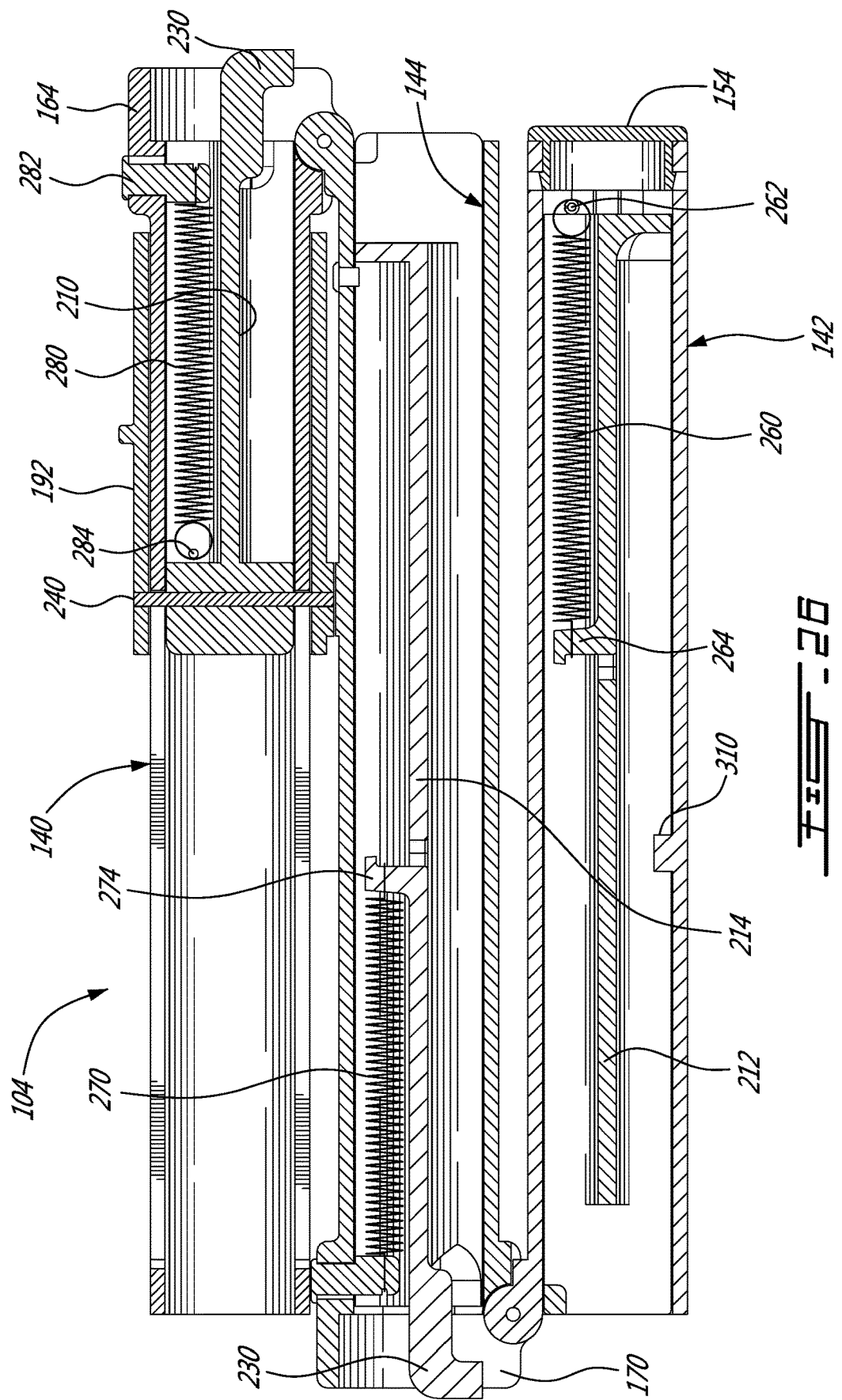

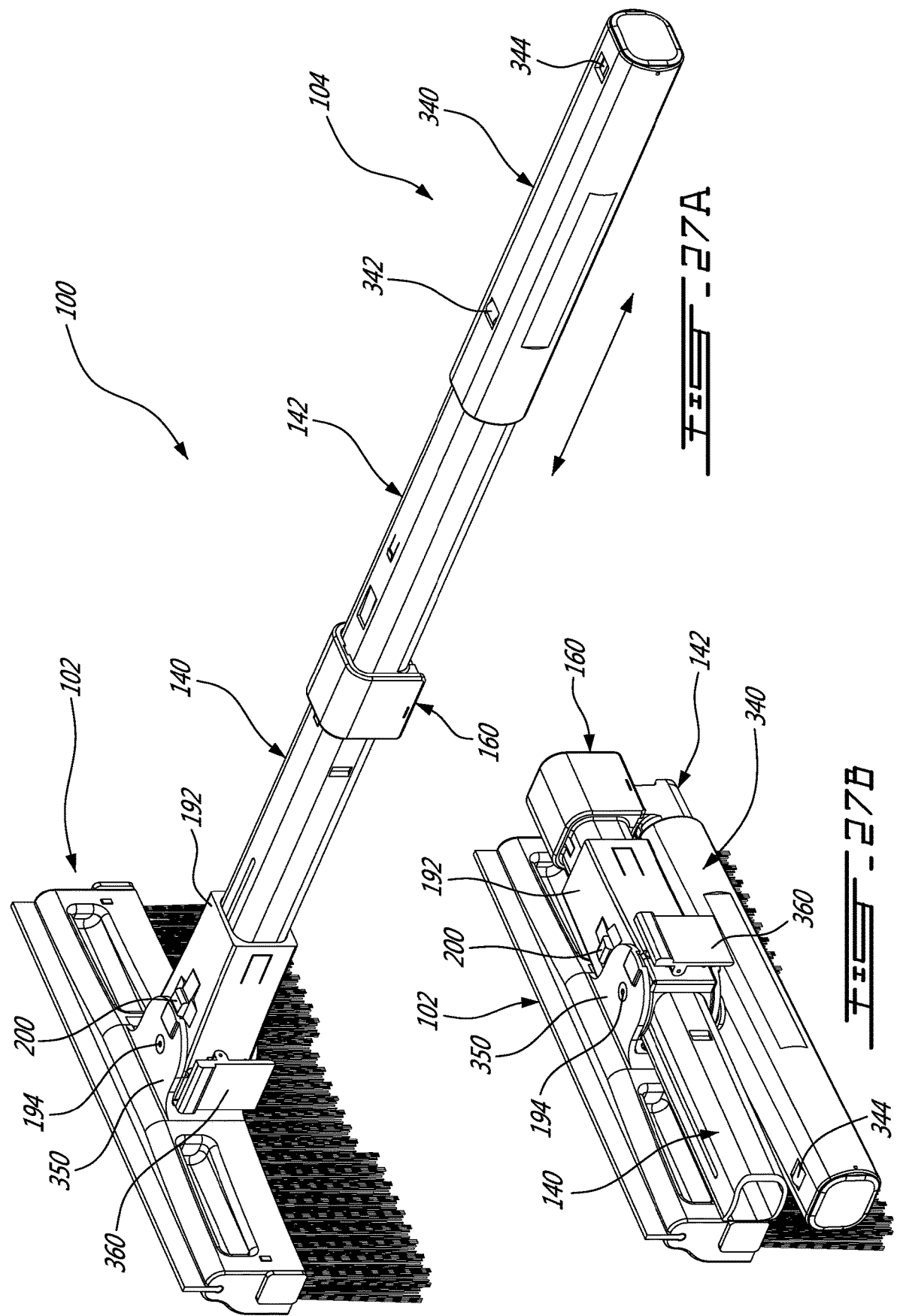

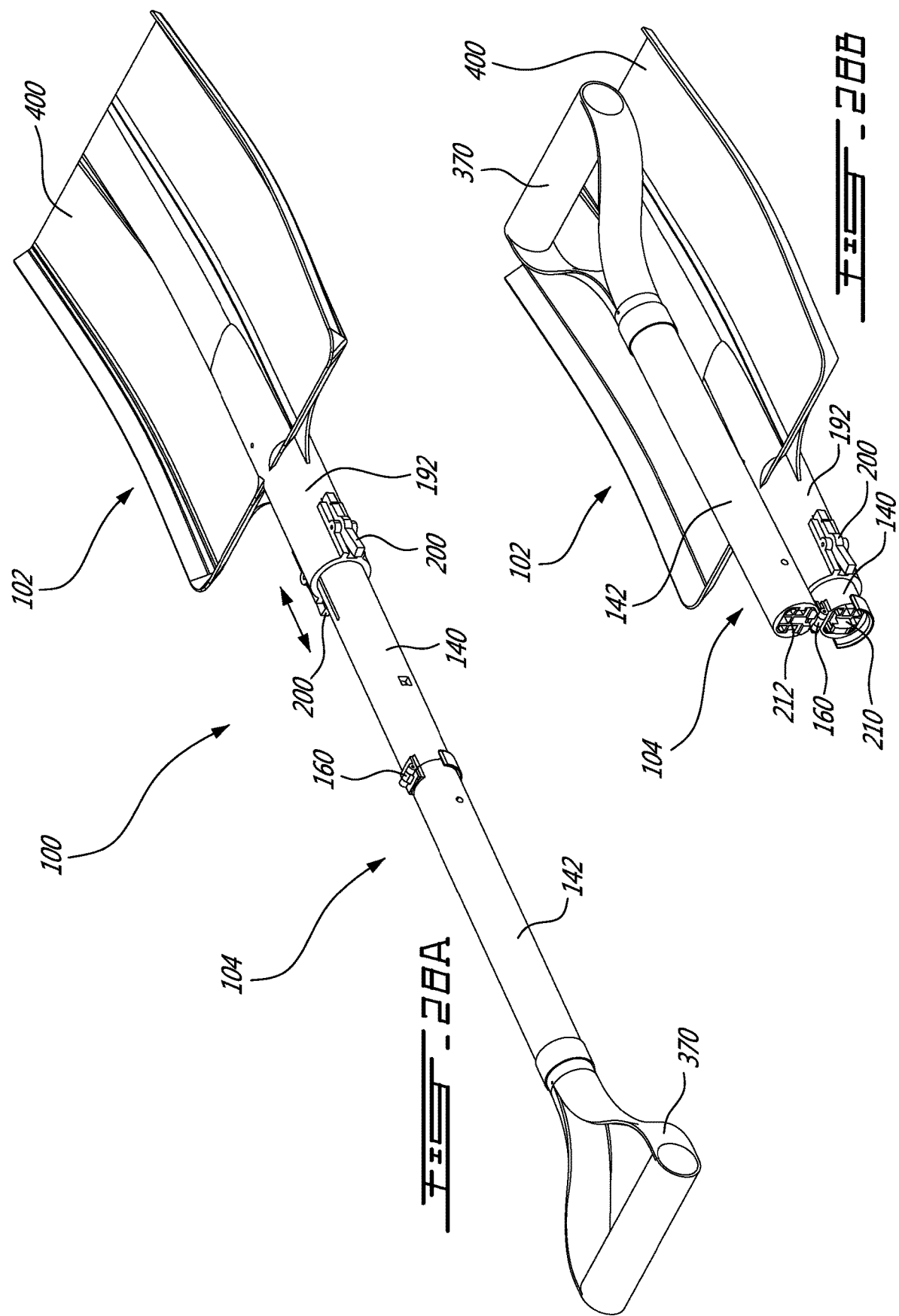

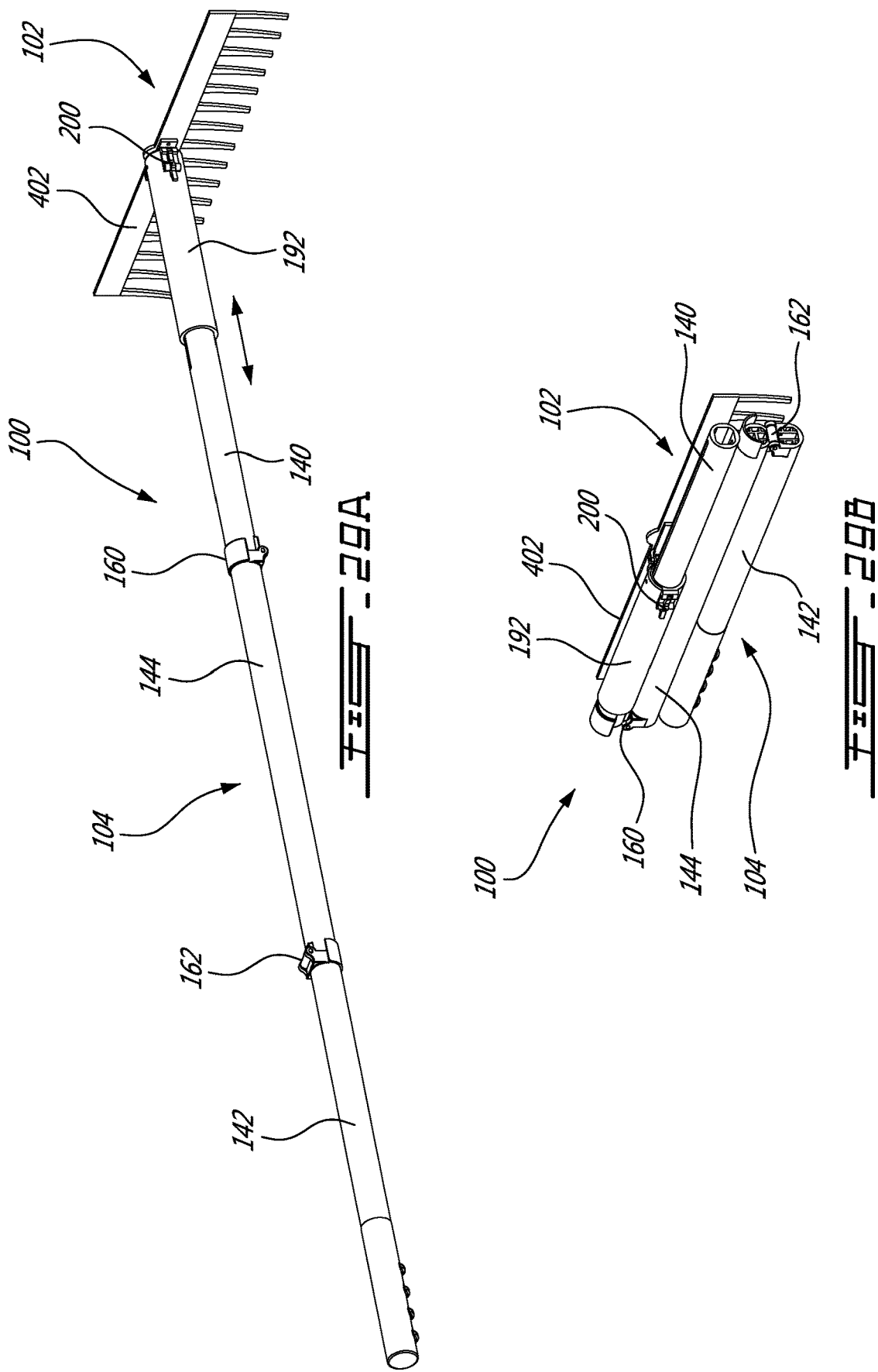

TOOL WITH ARTICULATED HANDLE

CROSS REFERENCE TO PRIOR APPLICATIONS

The present case is a continuation of PCT Application No. PCT/CA2019/050871 filed 21 Jun. 2019. PCT/CA2019/050871 claims the benefits of Canadian patent application No. 3,009,220 filed 22 Jun. 2018. The entire contents of these prior patent applications are hereby incorporated by reference.

TECHNICAL FIELD

The technical field relates generally to tools having an articulated handle. It also relates generally to articulated handles forming long slender objects for use in different contexts and environments.

TECHNICAL BACKGROUND

Collapsible handles can be very useful in a very wide range of applications, particularly with portable handheld tools involving a relatively long handle for its operation by the user. A collapsible handle has a stretched configuration when the tool being used or is ready to be used, and a collapsed configuration when it is not used, thereby minimizing the overall size of the tool. Reducing the size of the tool facilitates its transportation and storage.

Different kinds of collapsible handles exist. Some include juxtaposed segments that can be selectively attached when the handle is in the stretched configuration, and then completely detached from one another to bring the handle in the collapsed configuration. This approach increases the compactness of the handle when transported or stored. However, it also increases the risks of parts being misplaced or lost, among other things. Losing one or more segments often renders a tool useless.

Some collapsible handles have a telescopic construction where the handle length can be changed by moving embedded segments with reference to one another. However, because the segments must fit into one another, they are increasingly smaller in width towards the center of the stack and this may not be suitable for many applications, particularly when there are many segments. A locking mechanism is also required to hold each segment in position when the handle is in the stretched configuration.

Some collapsible handles have segments pivotally attached to one another by joints and that can be folded to bring the handle into the collapsed configuration. Such handles are referred to hereafter as articulated handles. They often require users to lock each joint in position one by one to keep the handle in the stretched configuration, then unlock each joint one by one when the handle is brought again into the collapsed configuration. Among other things, the added manipulative effort can be time consuming and some users may even be unable to open or close these handles because they lack the required dexterity or physical capacity. Still, the locking mechanisms are generally prone to premature wear after a relative short time and they often fail when subjected to heavy loads.

Examples of tools in which collapsible handles can be very useful include shovels and rakes, to name just a few. Collapsible handles can be provided on many other tools as well.

Snow-removal devices are also tools in which having a collapsible handle can be very advantageous. Many kinds of snow-removal devices were proposed over the years for removing snow and ice on automobiles or kinds of vehicles. In its simplest basic form, a snow-removal device includes a brush attached at one end of an elongated handle. This brush is mainly designed for whisking snow and ice pieces from the exterior surfaces of the vehicle. The handle is made relatively long so that a user could reach across the vehicle body while mitigating the contact therewith. Larger vehicles, for instance SUVs, generally require longer handles to reach some surfaces, particularly on the roof. Snow-removal devices are known to be difficult to store conveniently because of the elongated handle, even when they are designed for use with a relatively small vehicle. Some snow-removal devices include a movable handle section that can be slid out of a base handle section upon releasing a locking mechanism. The sliding motion can also open or close a foldable brush when the movable handle section is extended or retracted, respectively. However, these devices are still relatively large when folded.

Overall, there is still room for many improvements in the related technical fields.

SUMMARY

In one aspect, there is provided a tool including: a head assembly; an articulated handle having a stretched configuration and a collapsed configuration, the handle including: a proximal elongated hollow outer segment, the proximal outer segment having a proximal end and at least one longitudinally extending slideway; a distal elongated hollow outer segment, the distal outer segment having a distal end; an intervening hinge joint pivotally interconnecting the outer segments in juxtaposition, the outer segments being in alignment along a longitudinal axis when the handle is in the stretched configuration, and being folded back on one another when the handle is in the collapsed configuration; and a proximal and a distal elongated inner segment slidably mounted inside the outer segments, the inner segments having complementary end members that are self-interlocking in a linear force-transmitting engagement when the handle is in the stretched configuration, the inner segments being detached from one another when the handle is in the collapsed configuration; and a linkage assembly operatively attaching the handle to the head assembly, the linkage assembly including a sleeve member in sliding engagement with the proximal outer segment, the proximal outer segment being axially movable, with reference to the sleeve member, between at least a retracted position and an extended position, the proximal end of the proximal outer segment being further away from the sleeve member in the retracted position than in the extended position, whereby, when the proximal outer segment is in the extended position while the handle is in the stretched configuration, the interlocked complementary end members attaching the inner segments being positioned out of alignment with each junction between the outer segments.

In another aspect, there is provided a tool as shown, described and/or suggested herein.

In another aspect, there is provided an articulated handle as shown, described and/or suggested herein.

In another aspect, there is provided an articulated handle as shown, described and/or suggested herein.

More details on the various aspects and features of the proposed concept will become apparent in light of the detailed description which follows and the appended figures.

BRIEF DESCRIPTION OF THE FIGURES

FIG. 1 is an isometric view illustrating an example of a tool in accordance with the proposed concept, the illustrated tool being a snow-removal device;

FIG. 2 is a view similar to FIG. 1 once the side extensions of the brush are moved into a retracted position;

FIG. 3 is a longitudinal cross-sectional view of the tool taken along line 3-3 in FIG. 2;

FIG. 3A is an enlarged fragmentary view of the first hinge joint in FIG. 3;

FIG. 3B is an enlarged fragmentary view of the second hinge joint in FIG. 3;

FIG. 3C is an enlarged cross-sectional view of the proximal section of the handle in FIG. 3;

FIG. 3D is an enlarged fragmentary view of one of the notches made on the intermediate inner segment in FIG. 3C;

FIG. 3E is an enlarged cross-sectional view of the intermediate section of the handle in FIG. 3;

FIG. 3F is an enlarged fragmentary view of one of the stop tabs and a corresponding notch made on the intermediate inner segment in FIG. 3E;

FIG. 3G is an enlarged fragmentary view of one of the notches made on the distal inner segment in FIG. 3E;

FIG. 3H is an enlarged cross-sectional view of the distal section of the handle in FIG. 3;

FIG. 3I is an enlarged fragmentary view of one of the stop tabs and a corresponding notch made on the distal inner segment in FIG. 3H;

FIG. 4 is an enlarged transversal cross-sectional view of the tool taken along line 4-4 in FIG. 2;

FIG. 4A is an enlarged fragmentary view of one of the resilient cantilever stop tabs provided on the sleeve member and a corresponding notch made on the proximal outer segment in FIG. 4;

FIG. 4B is an enlarged fragmentary view showing one of the side grooves and its corresponding sliding member in FIG. 4;

FIG. 5 is an isometric view of the tool shown in FIG. 2 once the head assembly is pivoted to its folded back position with reference to the handle;

FIG. 6 is a longitudinal cross-sectional view of the tool taken along line 6-6 in FIG. 5;

FIG. 7 is an isometric view of the tool shown in FIG. 5 once the proximal outer segment is sled, with reference to the sleeve member, from its extended position to the retracted position;

FIG. 8 is a longitudinal cross-sectional view of the tool taken along line 8-8 in FIG. 7;

FIG. 10A is an enlarged fragmentary view of the partially opened first hinge joint in FIG. 10;

FIG. 10B is an enlarged fragmentary view of one of the stop tabs and the corresponding notch made on the intermediate inner segment in FIG. 10;

FIG. 10C is an enlarged fragmentary view of one of the stop tabs and the corresponding notch made on the distal inner segment in FIG. 10;

FIG. 13A is an enlarged fragmentary view of the rear end of the intermediate outer segment and the front end of the distal outer segment in FIG. 13;

FIG. 15 is a view similar to FIG. 14 once the side extensions of the brush are moved into a retracted position;

FIG. 16 is a longitudinal cross-sectional view of the tool taken along line 16-16 in FIG. 15;

FIG. 16A is an enlarged fragmentary view of the first hinge joint in FIG. 16;

FIG. 16B is an enlarged fragmentary view of the second hinge joint in FIG. 16;

FIG. 16E is an enlarged cross-sectional view of the distal section of the handle in FIG. 16;

FIG. 17 is an enlarged transversal cross-sectional view of the tool taken along line 17-17 in FIG. 15;

FIG. 18 is an isometric view of the tool shown in FIG. 15 once the head assembly is pivoted to its folded back position with reference to the handle;

FIG. 19 is a longitudinal cross-sectional view of the tool taken along line 19-19 in FIG. 18;

FIG. 20 is an isometric view of the tool shown in FIG. 18 once the proximal outer segment is sled, with reference to the sleeve member, from its extended position to the retracted position;

FIG. 26 is an enlarged side view of the tool in FIG. 25;

FIGS. 27A and 27B are isometric views illustrating another example of a tool in accordance with the proposed concept, this illustrated tool being also a snow-removal device;

FIGS. 28A and 28B are isometric views illustrating another example of a tool in accordance with the proposed concept, this illustrated tool being a shovel; and FIGS. 29A and 29B are isometric views illustrating another example of a tool in accordance with the proposed concept, this illustrated tool being a rake.

DETAILED DESCRIPTION

Figure 9:
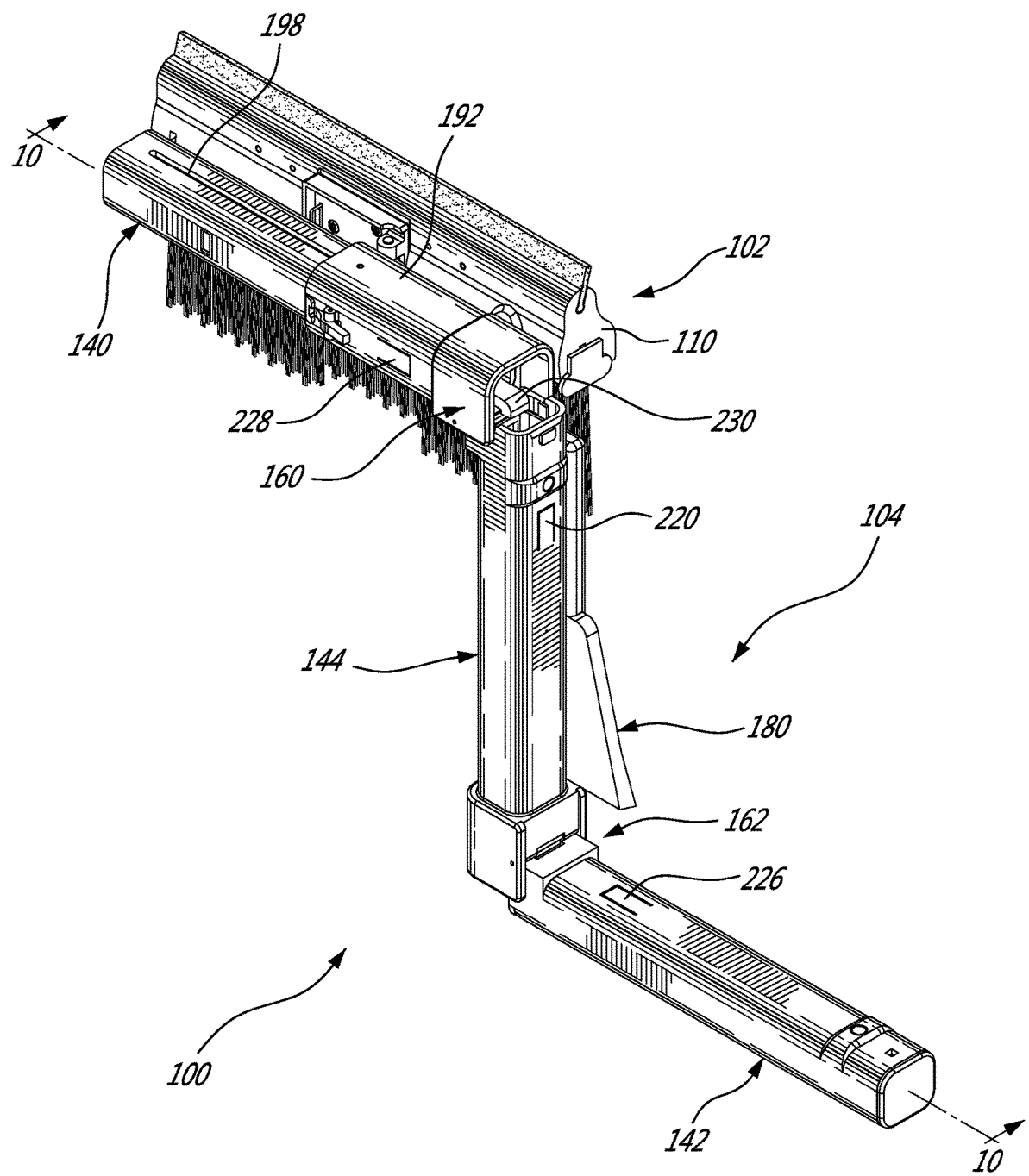
FIG. 9 is an isometric view of the tool shown in FIG. 7 once the outer segments are pivoted with reference to one another to move the handle towards its collapsed configuration.

FIG. 1 is an isometric view illustrating an example of a tool 100 in accordance with the proposed concept. The illustrated tool 100 is a snow-removal device. It is designed for removing snow and ice that accumulated on the outer surfaces of a vehicle, for instance an automobile. It can also be used on vehicles that are not automobiles, or even on objects that are not vehicles. This example is only one among numerous possible implementations. The present concept is not limited to the illustrated example, and it is also not limited to snow-removal devices. Among other things, snow and ice are not the only materials the illustrated tool 100 can remove, even without any modifications. Other possible materials include sand, dust, metal or plastic fragments and wood chips, to just name a few. Many others are possible as well. Nevertheless, for the sake of simplicity, the tool 100 will essentially be described in the context of the snow-removal device. This does not exclude using the proposed concept in other contexts and environments.

The tool 100 includes a head assembly 102 and an articulated handle 104 to which the head assembly 102 is attached. It is shown in a fully unfolded position in FIG. 1 and forms a handlebar that is straight and relatively rigid. The handle 104 is said to have a stretched configuration when the tool 100 is in this unfolded position. Furthermore, although the illustrated tool 100 includes both the head assembly 102 and the articulated handle 104 that are attached together, the head assembly 102 can be designed to be detachable from the handle 104 in normal use so that the user could selectively attach the same handle 104 to another kind of head assembly 102 and change the nature of the tool 100. Different kinds of head assemblies 102 are also possible for use with the handle 104.

The handle 104 can be manufactured and used as a stand-alone item, thus without having something else affixed to it, including a head assembly 102. It can then be used in implementations where a long object that can be unfolded and folded in a very short time would be advantageous. This includes forming objects that are not necessarily always referred to as handles. The word "handle" is thus used in the present text in a generic sense and it may also designate other objects, such as poles, stands, sticks, shafts, etc. In some cases, the handle 104 can be a part to which other implements are attached when it is already in its stretched configuration. Hence, in some implementations, the handle 104 can be folded and unfolded without being attached to a corresponding head assembly, or to another part, to remain in its stretched configuration.

The head assembly 102 of the illustrated example includes a main body 110 having a relatively flat and elongated shape. It is made of a relatively rigid material, for instance a molded plastic material, and it is used as a supporting element. Nevertheless, other shapes, materials and configurations are possible as well.

The illustrated head assembly 102 includes a brush 112 designed for whisking snow from the exterior of a vehicle. This brush 112 has a multitude of long plastic bristles extending downwards and one of the ends of these bristles are embedded into the main body 110. The bristles are made long enough and rigid enough to move the snow efficiently, but they are also designed to alleviate damages to the surface of the vehicle in normal use. Nevertheless, the whole brush 112 can be designed differently from what is shown and described, and even not include bristles. For instance, one can use a strip of material, such neoprene or the like, or a combination of different materials. Other variants are also possible.

The illustrated brush 112 further includes two side extensions 120, namely one at each end of the main body 110. Each side extension 120 includes an elongated base 122 slidably mounted inside a transversal groove 124 provided along the bottom edge of the main body 110. The groove 124 is open at both ends. Each side extension 120 is independent from the other. Each side extension 120 in the example also includes a row of bristles extending downwards and have one end embedded in the corresponding elongated base 122. The bristles on the side extensions 120 are slightly offset with reference to the bristles of the brush 112. An enlarged pull tab 126 is located at the outer tip of each side extension 120 to facilitate handling by the user. In use, one or both side extensions 120 can be manually set to the extended position by the user of the tool 100 to increase the overall width of the brush 112, as shown in FIG. 1. They can otherwise remain retracted inside the main body 110, as shown in FIG. 2, even when using the tool 100 to remove snow. They can also be only partially extended. FIG. 2 is a view similar to FIG. 1 once the side extensions 120 of the brush 112 are moved into a retracted position. Other arrangements and configurations are possible. The side extensions 120 can be omitted in some implementations.

The head assembly 102 of the example includes a squeegee strip 130 extending lengthwise along the entire top edge of the main body 110, thus on the edge opposite to the brush 112. The squeegee strip 130 can be made of a soft relatively resilient material, such as a rubber-like material. The squeegee strip 130 projects from a connecting arrangement 132, which can include embedding a base portion of the squeegee strip 130 within the main body 110 itself, as shown, or be an intervening piece that is embedded or otherwise attached to the main body 110. The squeegee strip 130 can be useful for removing water, wet snow or even a very thin layer of ice from a surface, in particular a glass surface. Nevertheless, other arrangements and configurations are possible. It can also be omitted in some implementations.

The handle 104 of the example includes three elongated hollow outer segments, namely a proximal outer segment 140, a distal outer segment 142 and an intermediate outer segment 144. As their names suggest, the proximal outer segment 140 is the one that is immediately adjacent to the head assembly 102, the distal outer segment 142 is the one at the free end of the handle 104, and the intermediate outer segment 144 is located between the proximal outer segment 140 and the distal outer segment 142. The outer segments 140, 142, 144 of the example are in alignment along a longitudinal axis 146 when the handle 104 is in the stretched configuration, as shown in FIG. 1. They are then locked in a substantially collinear manner. Variants in the construction are possible.

It should be noted that some implementations may omit the intermediate outer segment 144 or may include more than one intermediate outer segment 144. However, for the sake of simplicity, the rest of the present text will mostly refer to the tool 100 having one intermediate outer segment 144.

Figures 4, 4A, 4B:
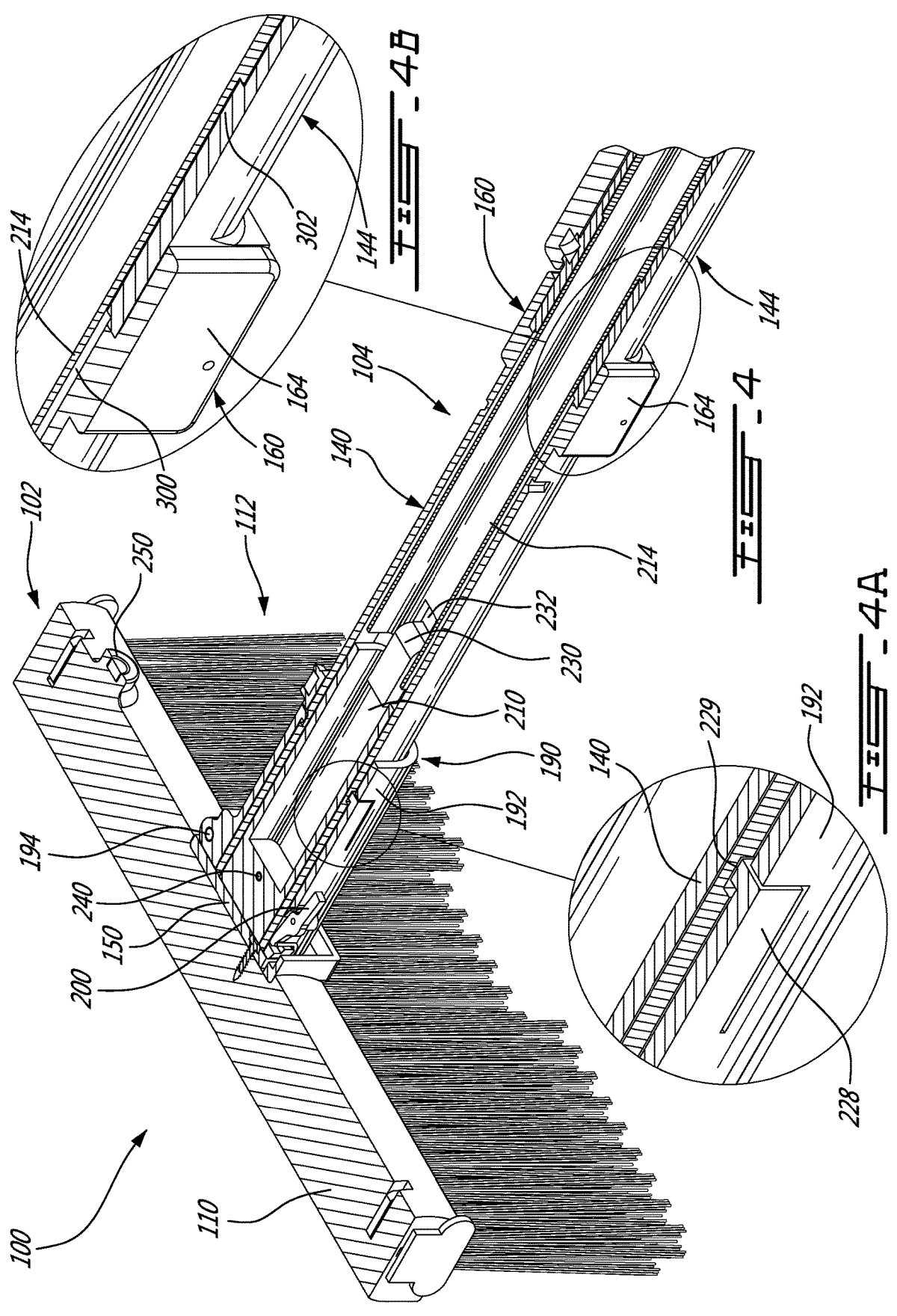

The end of the proximal outer segment 140 that is the closest to the head assembly 102 is referred to hereafter as the proximal end 150 (FIG. 4). The opposite end of the handle 104, located on the distal outer segment 142, is referred to hereafter as the distal end 152.

In the illustrated example, the outer segments 140, 142, 144 have a substantially rectangular cross-section, more particularly a substantially square-shaped cross-section. They each includes four outer walls having substantially planar outer surfaces and four rounded corners interconnecting these walls along the length thereof. These outer segments 140, 142, 144 are approximately equal in length in the illustrated example but variants are possible. The exact shape, size and construction of the outer segments 140, 142, 144 can be different in other implementations. Other arrangements and configurations are possible as well.

The outer segments 140, 142, 144 being hollow in the illustrated example, they each include a corresponding interior cavity. They are also open at both ends, except for the distal outer segment 142 that is closed by a cap 154 at the distal end 152 in the illustrated example. The cap 154 is attached using a snap-in engagement but any other suitable arrangement is possible. Other configurations and arrangements are possible. For instance, it is also possible to omit the cap 154 entirely in some implementations. The interior and/or the ends of one or more of the outer segments 140, 142, 144 can be constructed differently. Other variants are possible as well.

The handle 104 includes at least one intervening hinge joints. There are two hinge joints 160, 162 in the illustrated example that pivotally interconnect the outer segments 140, 142, 144 in juxtaposition. The hinge joints 160, 162 allow the handle 104 to be articulated while the outer segments 140, 142, 144 remain attached to one another all the time. Other configurations and arrangements are possible.

FIG. 3 is a longitudinal cross-sectional view of the tool 100 taken along line 3-3 in FIG. 2. FIG. 3 shows the interior of the handle 104 of the illustrated example along the entire length thereof.

The first hinge joint 160 in the illustrated example includes a reinforcement sleeve portion 164 that is an enlarged part rigidly attached or molded at one end of the proximal outer segment 140, more particularly the end that is opposite to its proximal end 150. FIG. 3A is an enlarged fragmentary view of the first hinge joint 160 in FIG. 3. Only about one half of the sleeve portion 164 overlaps the proximal outer segment 140. The other half extends beyond the end of the proximal outer segment 140 and overlaps the adjacent end on the intermediate outer segment 144 when the handle 104 is in the stretched configuration, as shown. Other configurations and arrangements are possible. Among other things, the sleeve portion 164 can be omitted in some implementations. Other variants are possible as well.

The first hinge joint 160 in the illustrated example includes a dual-axis hinge element 165 that creates the mechanical connection between the proximal outer segment 140 and the adjacent intermediate outer segment 144, as shown for instance in FIG. 3A. This hinge element 165 can include two spaced apart and transversally disposed cylindrical receptacles that are parallel to one another and perpendicular to the longitudinal axis 146, as shown. The body of the hinge element 165 can be somewhat M-shaped and the receptacles receive corresponding pins or the like to physically link them to the corresponding outer segments 140, 144. The hinge element 165 allows the corresponding outer segments 140, 144 to be positioned in juxtaposition, as shown, and to be pivoted over 180 degrees relative to one another. Other configurations and arrangements are possible. Among other things, the hinge element 165 can be replaced or be omitted in some implementations. Other variants are possible as well.

The second hinge joint 162 is located between the opposite end of the intermediate outer segment 144 and the distal outer segment 142. It has a construction similar to the first hinge joint 160 in the illustrated example, but it is located at the opposite end of the intermediate outer segment 144. FIG. 3B is an enlarged fragmentary view of the second hinge joint 162 in FIG. 3.

The hinge joint 162 also includes a reinforcement sleeve portion 170 and a dual-axis hinge element 171 that are similar to the sleeve portion 164 and the hinge element 165, respectively. Other configurations and arrangements are possible. Among other things, the first and second hinge joints 160, 162 can be constructed entirely differently and/or be designed to open differently compared to what is shown and described. Other variants are possible as well.

The hinge joints 160, 162 of the illustrated example break alternatively to opposite sides of the handle 104 and, in the figures, this is why the hinge element 165 is located on the bottom side of the handle 104 while the hinge element 171 is located on the top side thereof. Other configurations and arrangements are possible.

If desired, the hinge elements 165, 171 can be designed to exhibit a resilient tension urging its two side parts closer together. This can be made, for instance, using a metallic body having a wavy shape as shown. Each hinge element 165, 171 could be designed to act somewhat like a spring. This can help keep the sections of the handle 104 in alignment when they are pivoted. The resilient body can also allow each hinge element 165, 171 to slightly extend in width, thus in a direction parallel to the longitudinal direction of the handle 104, for instance during a flexion of the handle 104, so as to prevent overloading the corresponding pins to which the hinge elements 165, 171 are attached. Other configurations and arrangements are possible as well. These features can be omitted in some implementations.

The illustrated example includes an ice scraper 180 that is removably attached to one side of the intermediate outer segment 144. This ice scraper 180 includes a base portion 182 that is relatively flat in shape. The base portion 182 has an elongated first section and a second section that is somewhat triangular in shape. The second section includes a rear beveled scraping edge 184. The scraping edge 184 can be straight, as shown, or it can include indentations or the like to cut more easily through a layer of solid ice. The ice scraper 180 can be detached from the handle 104 and be repositioned at or close to end distal end 152 so that the scraping could extend slightly beyond the distal end 152. Other configurations and arrangements are possible. The ice scraper 180 can be shaped differently and/or can be attached differently to the handle 104, including being rigidly attached. It can also be omitted entirely in some implementations. Other variants are possible as well.

The handle 104 of the illustrated example further includes a plurality of elongated inner segments 210, 212, 214 that are slidably mounted inside the outer segments 140, 142, 144, as shown for instance in FIG. 3. One is the proximal inner segment 210, one is the distal inner segment 212 and one is the intermediate inner segment 214. The inner segments 210, 212, 214 are sized and shaped so that the relative sliding motion inside the outer segments 140, 142, 144 can be made easily. However, the tolerances should be kept as small as possible to maintain a tight fit at the junctions between the outer segments 140, 142, 144. This will prevent the outer segments 140, 142, 144 from being somewhat loose when the handle 104 is in its stretched configuration. Keeping the outer segments 140, 142, 144 steadily in a rectilinear configuration will also mitigate stresses on the hinge joints 160, 162 when the handle 104 is subjected to flexion. The number of inner segments 210, 212, 214 corresponds to the number of outer segments 140, 142, 144. Hence, if more than one intermediate outer segment 144 were present, more than one additional intermediate inner segment 214 would be provided as well. The intermediate inner segment 214 will be omitted when no intermediate outer segment is present.

The inner segments 210, 212, 214 can be made of a rigid material such as a metal or a plastic. They are substantially hollow in the illustrated example. The inner segments 210, 212, 214 will be concealed from the view of the users in normal use, with the exception of some of their ends. They will not be prone to scratching and they do not need to have an aesthetically pleasing surface or finish. This feature provides a lot of new possibilities to designers. Variants are possible as well.

The inner segments 210, 212, 214 of the illustrated example have complementary end members 230, 232 cooperating with one another. These complementary end members 230, 232 are self-interlocking in a linear force-transmitting engagement when the handle 104 is in the stretched configuration, as shown for instance in FIG. 3C. FIG. 3C is an enlarged cross-sectional view of the proximal section of the handle 104 in FIG. 3. It shows the complementary end members 230, 232 between the proximal inner segment 210 and the intermediate inner segment 214. The complementary end members 230, 232 are detached from one another when the handle 104 is folded. In the example, one of the end members 230 has a right-angle hook shape that fits into the opposite end member 232. This opposite end member 232 includes a corresponding socket space having a flat portion and a transversal inwardly projecting ledge. As can be seen, for instance in FIG. 3C, bringing the two corresponding outer segments 140, 144 in alignment automatically puts these two complementary end members 230, 232 into a linear force-transmitting engagement. Likewise, pivoting the outer segments 140, 144 out of alignment automatically removes the linear engagement.

It should be noted that other configurations and arrangements are possible for the complementary end members 230, 232. For instance, one can use other kinds of interlocking parts or even something totally different, such as a set of magnets or a magnet that attaches to a corresponding piece made of steel or the like so as to interlock the inner segments 210, 212, 214 when their ends are brought against one another. Using a removable interfering engagement between two parts is another alternative. Many other variants are possible as well.

The complementary end members 230, 232 interlocking the inner segments 210, 212, 214 of the illustrated example are positioned out of alignment with junctions between the outer segments 140, 142, 144 when the proximal outer segment 140 is in the extended position while the handle 104 is in its stretched configuration. This causes the shank of the intermediate inner segment 214 to extend across the junction between the proximal outer segment 140 and the intermediate outer segment 144, thereby keeping these two outer segments 140, 144 in-line and preventing a pivotal motion around the first hinge joint 160. Likewise, the shank of the distal inner segment 212 to extend across the junction between the intermediate outer segment 144 and the distal outer segment 142, thereby keeping these two outer segments 142, 144 in-line and preventing a pivotal motion around the second hinge joint 162.

FIG. 3D is an enlarged fragmentary view of one of the notches 222 made on the intermediate inner segment 214 in FIG. 3C. The notch 222 in the illustrated example is made on the outer surface over the intermediate inner segment 214 and there is also a similar notch 222 on the bottom sidewall, as can be seen in FIG. 3C. These notches 222 are part of a position restricting arrangement. They are designed to be engaged by corresponding resilient stop tabs 220 at end positions. The stop tabs 220 can be seen in FIG. 3E and in FIG. 3F. FIG. 3E is an enlarged cross-sectional view of the intermediate section of the handle 104 in FIG. 3. FIG. 3F is an enlarged fragmentary view of one of the stop tabs 220 and a corresponding notch 222 made on the intermediate inner segment 214 in FIG. 3E. There are thus two spaced-apart sets of notches 222 on the intermediate inner segment 214 in the example, namely the set seen in FIG. 3C and the set seen in FIG. 3E. The illustrated stop tabs 220 have a cantilever construction and they each include an inwardly projecting flange at their free end. Each notch 222 in the example has a transversally extending planar wall that is generally perpendicular to the sidewall surface, an obliquely disposed transversally extending wall, and a substantially planar surface extending between them. Each flange engages the planar wall of a notch 222 at the illustrated position, thereby preventing the intermediate inner segment 214 from moving beyond that point with reference to the intermediate outer segment 144. However, the relative motion in the opposite direction is allowed because the flange at the free end of the stop tab 220 can go over the oblique wall and slid over the sidewall until it engages the corresponding notch 222 of the other set. Other configurations and arrangements are also possible. Among other things, these features can be omitted in some implementations. Other variants are possible as well.

FIG. 3E shows that there are notches 224 on the distal inner segment 212. FIG. 3G is an enlarged fragmentary view of one of the notches 224 made on the distal inner segment 212 in FIG. 3E. A second set of notches 224 is further provided on the distal inner segment 212, as shown in FIG. 3H. FIG. 3H is an enlarged cross-sectional view of the distal section of the handle 104 in FIG. 3. The notches 224 have a configuration that is similar to the notches 222 in the illustrated example. The notches 224 are designed to be engaged by corresponding resilient cantilever stop tabs 226 at specific end position. FIG. 3I is an enlarged fragmentary view of one of the stop tabs 226 and a corresponding notch 224 made on the distal inner segment 212 in FIG. 3H. Other configurations and arrangements are possible. Among other things, these features can be omitted in some implementations. Other variants are possible as well.

FIG. 4 is an enlarged transversal cross-sectional view of the tool 100 taken along line 4-4 in FIG. 2. It shows only the head assembly 102 as well as some of the parts of the handle 104 that are adjacent to the head assembly 102 in the illustrated example.

The head assembly 102 of this implementation is operatively attached to the handle 104 through a linkage assembly 190. The linkage assembly 190 includes a sleeve member 192 mounted around the proximal outer segment 140 of the handle 104. The linkage assembly 190 also includes a hinge joint 194 pivotally connecting the sleeve member 192 to the head assembly 102, more particularly to the rear side of the main body 110. The hinge joint 194 is perpendicular to the longitudinal axis 146 (see for instance FIG. 1). Other configurations and arrangements are possible. Among other things, the sleeve member 192 can be replaced by another component or be omitted entirely in some implementations. The head assembly 102 and the handle 104 may be attached differently, including without a pivot or even a linkage assembly. Other variants are possible as well.

In the illustrated example, the interior of the sleeve member 192 is made slightly larger than the exterior of the proximal outer segment 140. This allows the proximal outer segment 140 to slide with reference to the sleeve member 192 once a latching mechanism is unlocked and the head assembly 102 is pivoted with reference to the handle 104. The sliding motion is prevented when the proximal end 150 abuts against the rear side of the main body 110, as shown for instance in FIG. 4. The sleeve member 192 may otherwise slide with reference to the proximal outer segment 140, once the latching mechanism is unlocked and the head assembly 102, is pivoted along at least one longitudinally extending slideway 198. This slideway 198 is located on the top side surface of the proximal outer segment 140 in the illustrated example, as shown for instance in FIGS. 1 and 2. There is a second identical slideway on the opposite side surface of the proximal outer segment 140, namely the surface at the bottom. Both slideways 198 are rectilinear, located along the medial line on the side surfaces, and made through the corresponding sidewalls. Other configurations and arrangements are possible. Among other things, the slideway and/or other parts mentioned herein could be omitted in some implementations. Other variants are possible as well.

The proximal outer segment 140 is axially movable with reference to the sleeve member 192 between at least a retracted position and an extended position. The proximal outer segment 140 is shown in the extended position in FIGS. 1 to 4 since the maximum length thereof was pulled out of the sleeve member 192 and its proximal end 150 is in its closest position with reference to the sleeve member 192 in this implementation. The proximal end 150 will be further away from the sleeve member 192 in the retracted position.

In the illustrated example, the latching mechanism includes a single finger-actuated lever 200 pivotally mounted on the side of the sleeve member 192 through a hinge pin or the like, as shown for instance in FIG. 4. The proximal edge of the lever 200 can include a hook or the like designed to engage the edge of a holding rod 202 (FIG. 5) provided on the back side of the main body 110, in a latching relationship. The latching mechanism can lock the sleeve member 192 in the perpendicular position with reference to the head assembly 102 and in a load supporting manner. Pushing on the distal side of the lever 200 can release the latching engagement and then allow the head assembly 102 to pivot around the hinge joint 194 towards its folded back position. The head assembly 102 in this implementation is designed to be pivotable between at least an unfolded position and a folded back position when the proximal outer segment 140 is in the extended position. Moving the sleeve member 192 from the folded back position into the unfolded position automatically locks the latching mechanism. Other configurations and arrangements are possible. Among other things, the latching mechanism can be designed differently or be replaced by another feature. It can also be entirely omitted in some implementations. Other variants are possible as well.

FIG. 4A is an enlarged fragmentary view of one of the resilient cantilever stop tabs 228 provided on the sleeve member 192 and a corresponding notch 229 made on the proximal outer segment 140 in FIG. 4. A similar arrangement is provided on the opposite side. They are both on the lateral sides rather than the top and bottom sides because the top and bottom sides already have the slideway 198. They work in a similar way as the notches 222 and their corresponding stop tabs 226. FIG. 4B is an enlarged fragmentary view from FIG. 4. Other configurations and arrangements are possible. Among other things, these features can be omitted in some implementations. Other variants are possible as well.

In the illustrated example, a linking member 240 secures the sleeve member 192 to the proximal inner segment 210. This linking member 240 can be a pin having its two ends attached to the sleeve member 192 and extending across a proximal end of the proximal inner segment 210, as shown in the example. The pin 240 passes inside the two opposite slideways 198 of the proximal outer segment 140. The pin 240 maintains the proximal inner segment 210 at the same position with reference to the sleeve member 192. It should be noted that other configurations and arrangements are possible.

FIG. 5 is an isometric view of the tool 100 shown in FIG. 2 once the head assembly 102 is pivoted to its folded back position with reference to the handle 104. The handle 104 is still in a stretched configuration in FIG. 5 and the various sections of the handle 104 are still prevented from being pivoted relative to one another around the hinge joints 160, 162.

If desired, as shown in the example, the side surface of the sleeve member 192 facing the back of the main body 110 can engage a stopper 250 provided on the back of the main body 110. The stopper 250 limits the relative pivot movement between the head assembly 102 and the sleeve member 192. The stopper 250 can also be seen in some of the other figures. Alternatively, the stopper 250 can be provided on the sleeve member 192 instead of the main body 110. Other arrangements and configurations are possible. The stopper 250 can be omitted entirely in some implementations.

FIG. 6 is a longitudinal cross-sectional view of the tool 100 taken along line 6-6 in FIG. 5. As can be seen, the relative position of the inner segments 210, 212, 214 with reference to the outer segments 140, 142, 144 is still unchanged from what is shown in FIG. 3 at this moment.

FIG. 7 is an isometric view of the tool 100 shown in FIG. 5 once the proximal outer segment 140 is sled, with reference to the sleeve member 192, from its extended position to its retracted position. This motion results from a force applied, for instance by the user, to reposition the proximal end 150 of the proximal outer segment 140 away from the sleeve member 192. The proximal outer segment 140 is now extending entirely behind the head assembly 102 in this implementation. Variants are possible as well.

FIG. 8 is a longitudinal cross-sectional view of the tool 100 taken along line 8-8 in FIG. 7. As can be seen, the relative positions of the inner segments 210, 212, 214 with reference to the outer segments 140, 142, 144 are now different from what is shown in FIGS. 3 and 6 since the sliding movement between the sleeve member 192 and the outer segments 140, 142, 144 also caused a relative linear movement between the outer segments 140, 142, 144 and the inner segments 210, 212, 214. All the inner segments 210, 212, 214 were repositioned, with reference to the outer segments 140, 142, 144, because the linking member 240 prevents the proximal inner segment 210 from moving and because of the linear force-transmitting engagement between the complementary end members 230, 232. The inner segments 210, 212, 214 of the illustrated example are now substantially entirely within a corresponding one of the outer segments 140, 142, 144. The complementary end members 230, 232 (see for instance FIG. 3C) are also now in registry with the junctions between the pairs of adjacent outer segments 140, 142, 144. Thus, the hinge joints 160, 162 are no longer locked at this point. Other configurations and arrangements are possible.

FIG. 9 is an isometric view of the tool 100 shown in FIG. 7 once the outer segments 140, 142, 144 are pivoted with reference to one another to move the handle 104 towards its collapsed configuration. The handle 104 is not in its collapsed configuration yet and FIG. 9 is thus only an intermediate position shown for the sake of illustration.

Figure 10:
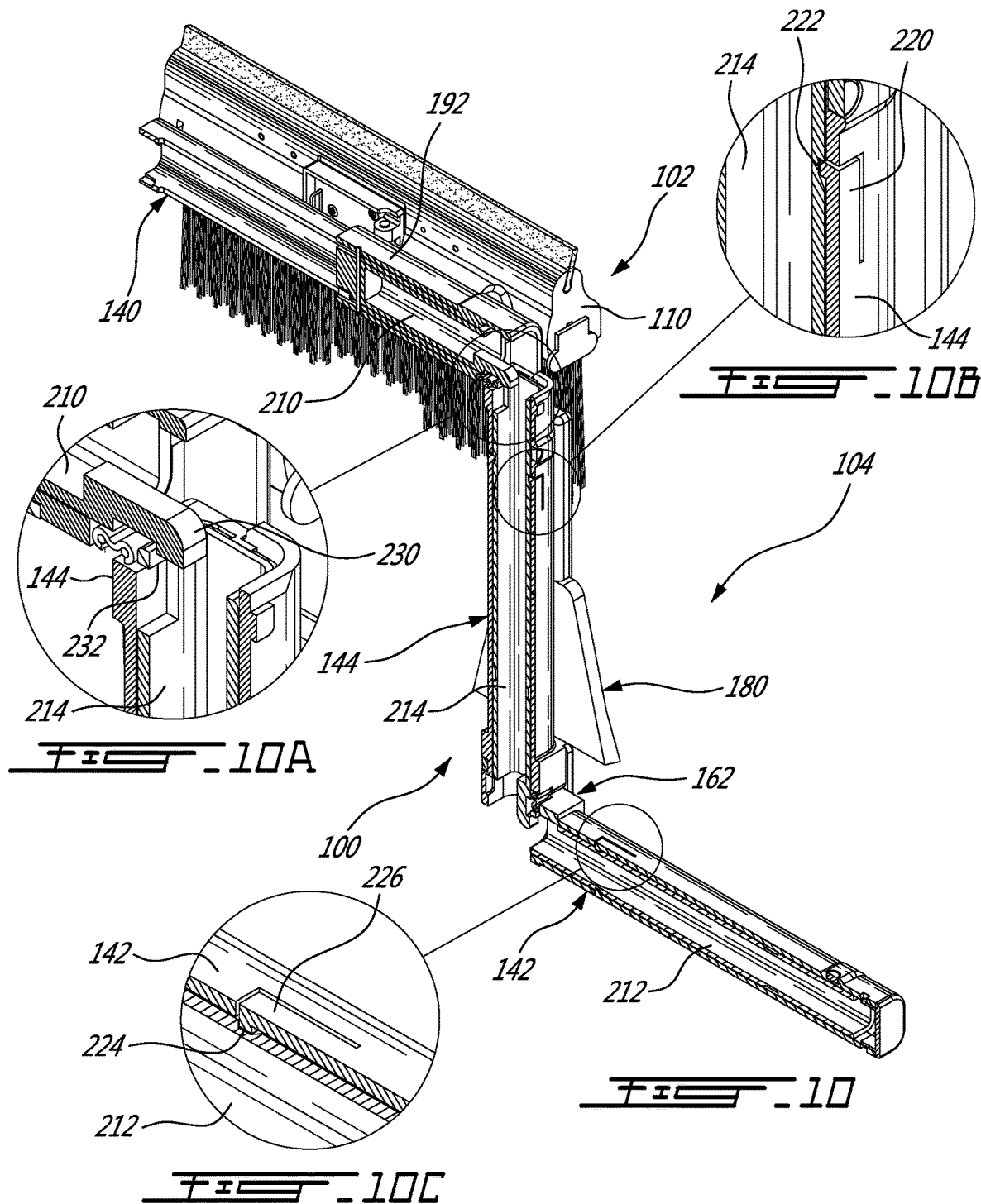
FIG. 10 is a longitudinal cross-sectional view of the tool taken along line 10-10 in FIG. 9.

FIG. 10 is a longitudinal cross-sectional view of the tool 100 taken along line 10-10 in FIG. 9. FIG. 10A is an enlarged fragmentary view of the partially opened first hinge joint 160 in FIG. 10. It shows that the end member 230 located on the proximal inner segment 210 in the illustrated example is now detached from the opposite end member 232 located on the intermediate inner segment 214.

FIG. 10B is an enlarged fragmentary view of one of the stop tabs 220 and the corresponding notch 222 made on the intermediate inner segment 214 in FIG. 10.

FIG. 10C is an enlarged fragmentary view of one of the stop tabs 226 and the corresponding notch 224 made on the distal inner segment 212 in FIG. 10.

Figure 11:
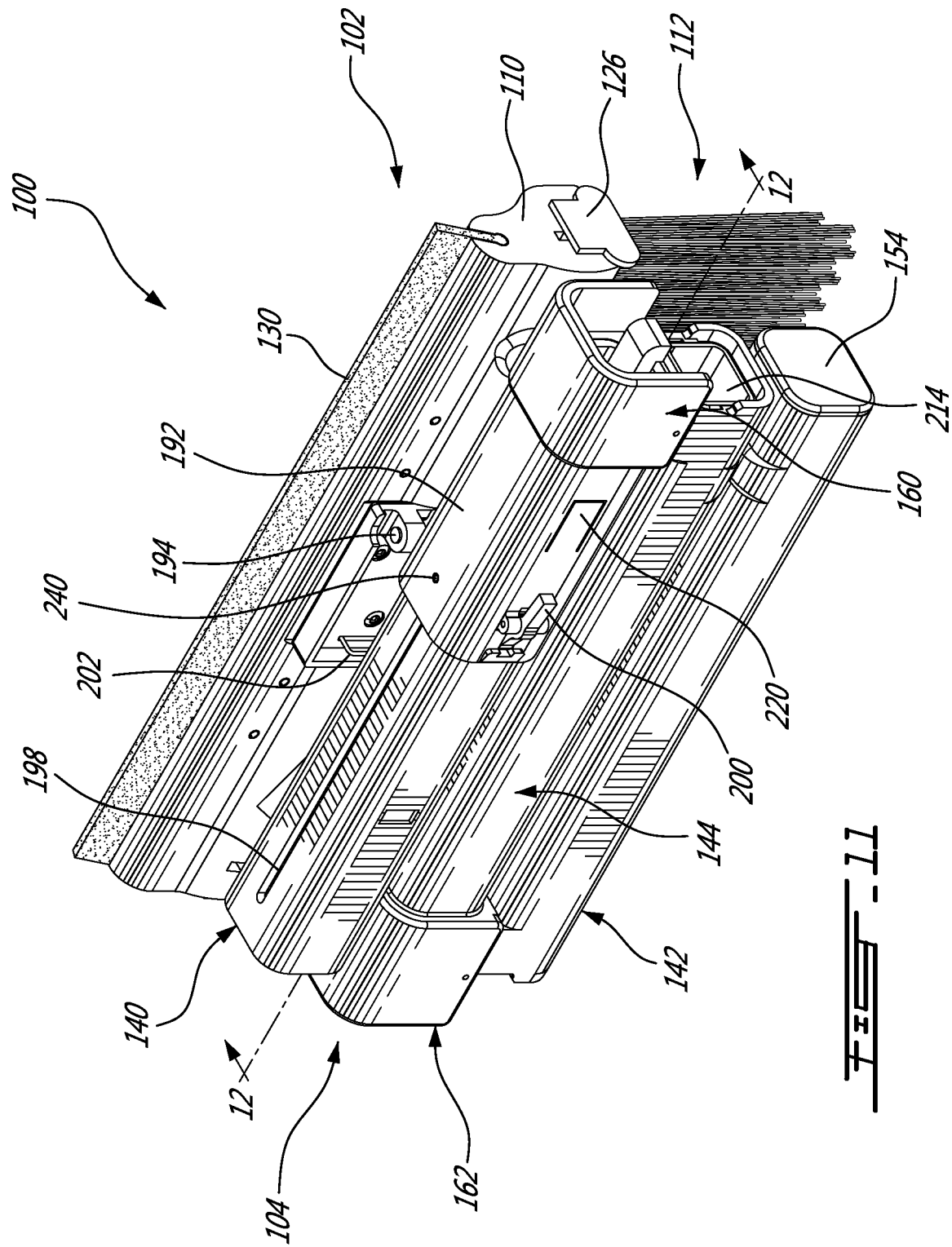
FIG. 11 is an isometric view of the tool shown in FIG. 9 once the handle of the illustrated example is in its collapsed configuration.
Figure 12:
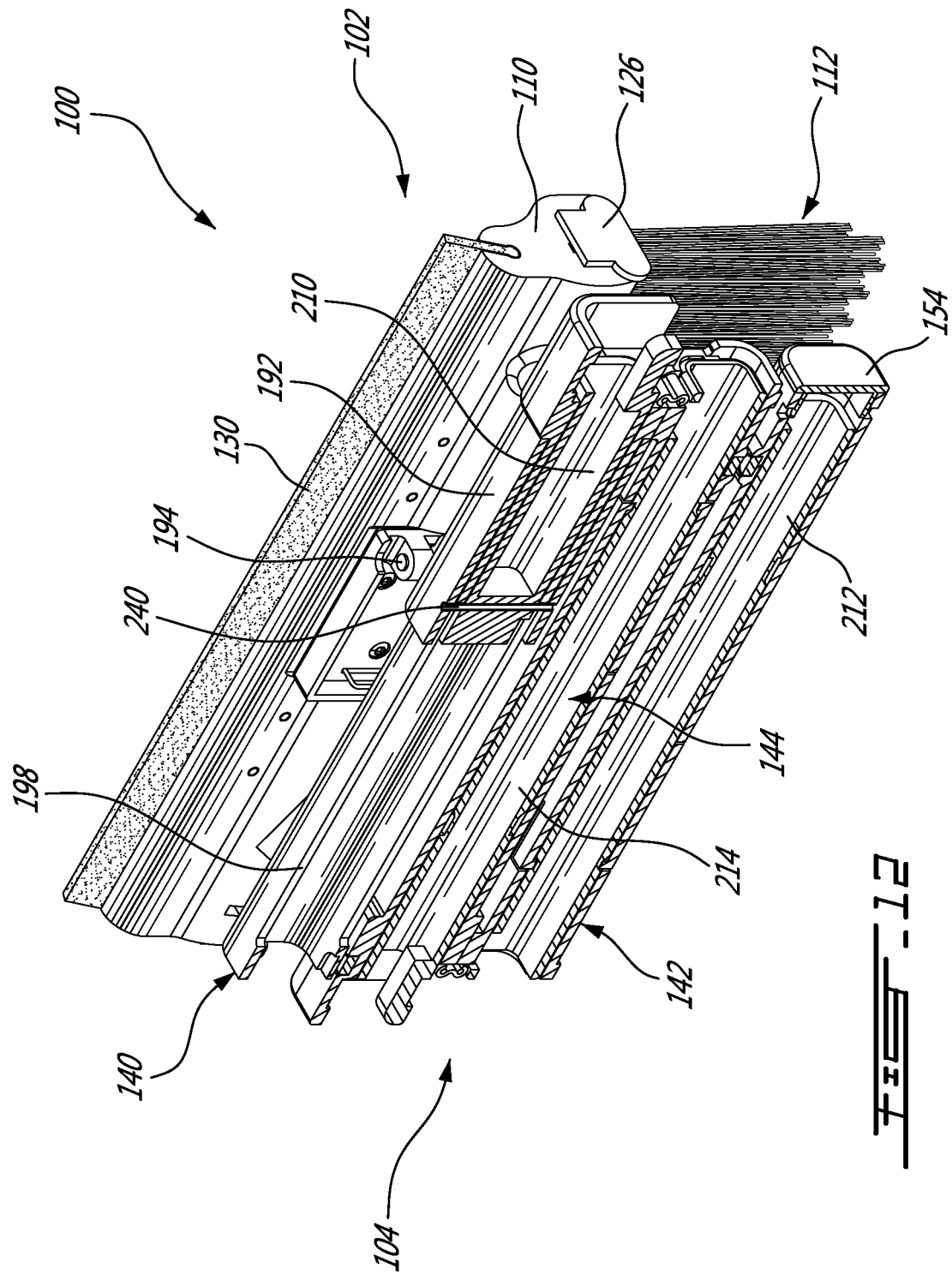
FIG. 12 is a longitudinal cross-sectional view of the tool taken along line 12-12 in FIG. 11.

FIG. 11 is an isometric view of the tool 100 shown in FIG. 9 once the handle 104 of the illustrated example is in its collapsed configuration. FIG. 12 is a longitudinal cross-sectional view of the tool 100 taken along line 12-12 in FIG. 11. As can be appreciated, the handle 104, thus the tool 100, will only occupy a very compact space once folded. It may thus be easily carried and stored when not in use. It can also be folded and unfolded with only a minimal manipulative effort and level of difficulty and the main constituent parts of the handle 104 cannot become detached in this implementation. This unitary design alleviates the risks of handle parts being misplaced or lost.

Figure 13:
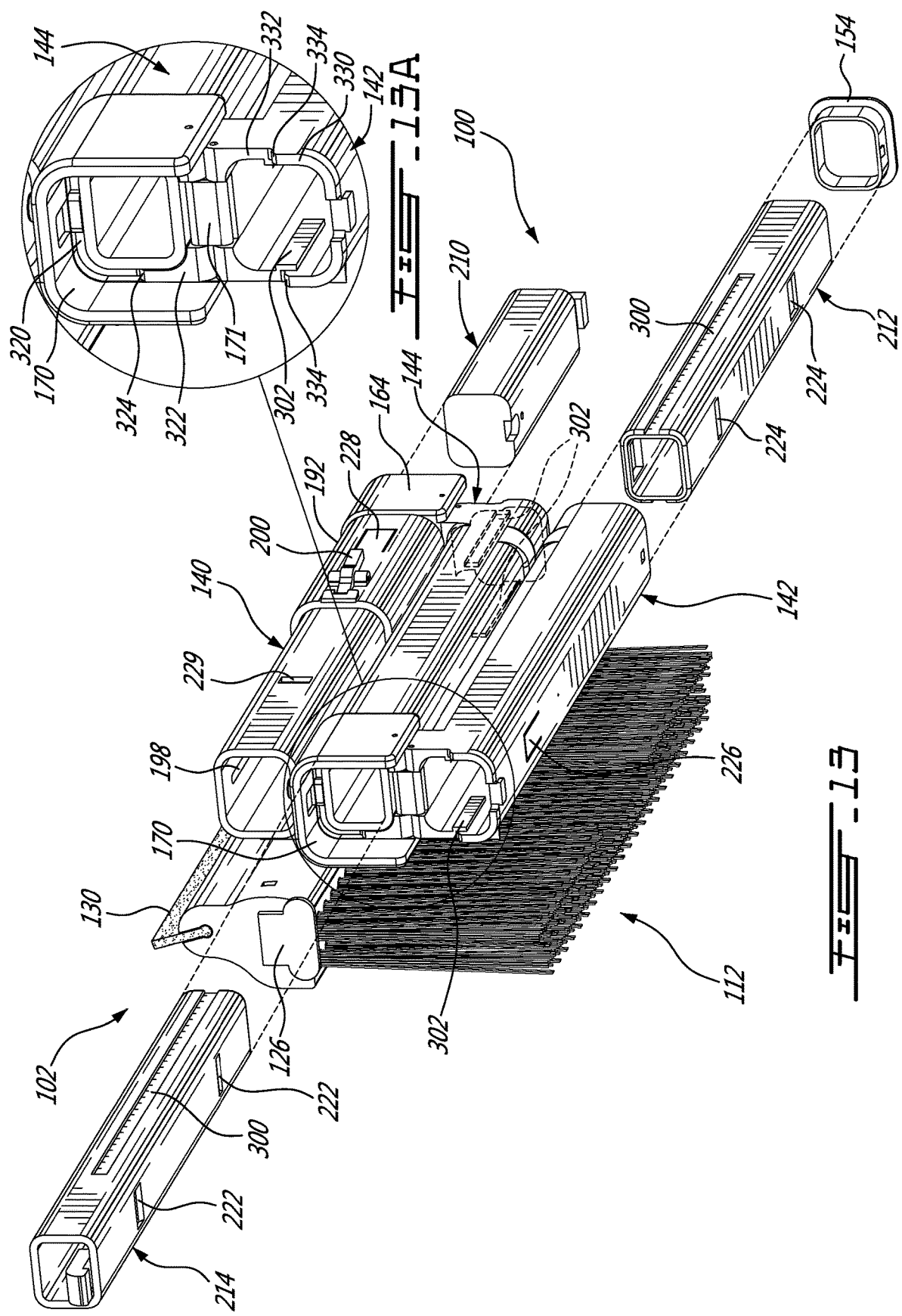
FIG. 13 is an isometric and partially exploded side view of the tool in FIG. 11.

FIG. 13 is an isometric and partially exploded side view of the tool 100 in FIG. 11. FIG. 13 shows that the distal inner segment 212 and the intermediate distal inner segment 214 of the illustrated example each include a longitudinally extending side groove 300 along their lateral side walls. There is one side groove 300 on each side. These grooves 300 are configured and disposed to cooperate with corresponding inwardly projecting sliding members 302 provided on inner sidewalls of the distal outer segment 142 and the intermediate outer segment 144. One of the grooves 300 and one of the sliding members 302 are also shown in FIG. 4B. As can be seen, the sliding member 302 abuts against the rear end of the groove 300. The sliding members 302 can slide along the groove 300. When the handle 104 is in a stretched configuration, the grooves 300 will be located across a corresponding one of the hinge joints 160, 162. The sliding members 302 have an elongated rectangular shape and each groove 300 cooperates with one sliding member 302. This arrangement increases the resistance of the handle 104 because the axial forces applied along the handle 104 will bypass the hinge elements 165, 171. Other configurations and arrangements are possible. This feature can also be omitted in some implementations. One could also include corresponding grooves 300 and sliding members 302 on the distal outer segment 142 and the distal inner segment 212 only. The position of the grooves 300 and of the sliding members 302 could possibly be inverted. Other variants of arrangements that can transfer the axial forces are possible as well.

FIG. 13 further shows that in the illustrated example, the rear end of the intermediate outer segment 144 and the front end of the distal outer segment 142 have complementary sections. This is best shown in FIG. 13A. FIG. 13A is an enlarged fragmentary view of the rear end of the intermediate outer segment 144 and the front end of the distal outer segment 142 in FIG. 13. The rear end of the intermediate outer segment 144 has two sections 320, 322 in the illustrated example.

These two sections 320, 322 have surfaces that are substantially perpendicular to longitudinal direction, but they are slightly longitudinally offset with reference to one another. Slanted surfaces 324 are provided between the two sections 320, 322. Furthermore, the front end of the distal outer segment 142 has two sections 330, 332 and slanted surfaces 334 between them. The sections 330, 332 and the slanted surfaces 334 at the front end of the distal outer segment 142 are the inverted counterparts of those at the rear end of the intermediate outer segment 144 so that they all fit together when the handle 104 is in the stretched configuration. There is a similar arrangement between the front end of the intermediate outer segment 144 and the rear end of the proximal outer segment 140. Such construction helps keep the mating ends in registry with one another when the handle 104 is moved into in its stretched configuration and the inner segments 212, 214 are not yet extending across the hinge joints 160, 162. Other shapes, configurations and arrangements are possible. These features can also be omitted in some implementations or be provided only at one of the junctions.

Figure 14:
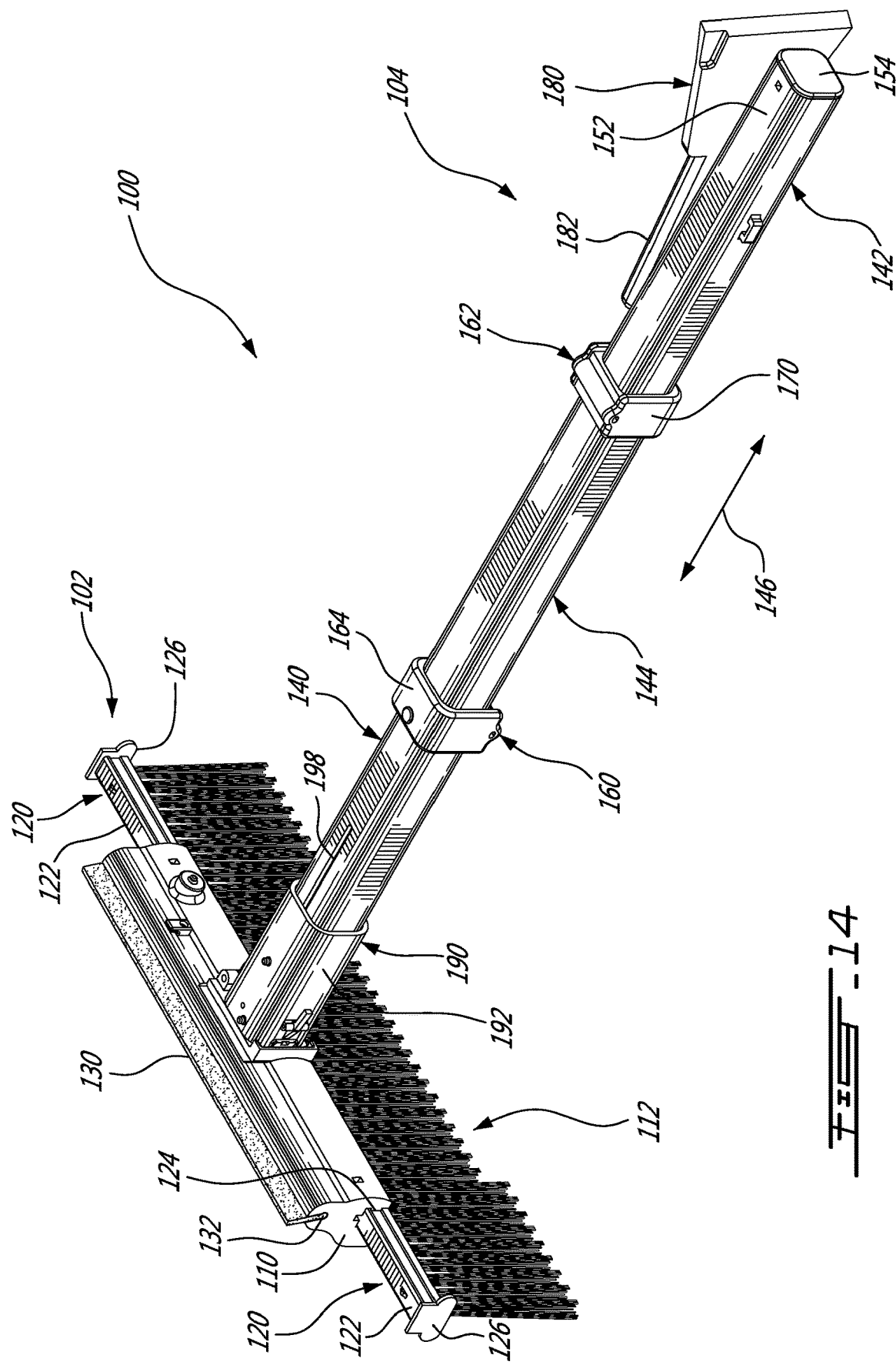
FIG. 14 is an isometric view illustrating another example of a tool in accordance with the proposed concept, this tool being also a snow-removal device.

FIG. 14 is an isometric view illustrating another example of a tool 100 in accordance with the proposed concept. This tool 100 is also a snow-removal device. It includes a head assembly 102 and an articulated handle 104 attached to the head assembly 102. The head assembly 102 includes a main body 110 having a brush 112. The second snow-removal device is a tool that is somewhat similar to the first example shown in FIGS. 1 to 13. Some of the design variants in the second example can be implemented in the first example, and vice versa. Still, many other implementations are possible as well.

It should be noted that the numerous details appearing in the description on how the tool 100 of the example illustrated in FIGS. 1 to 13 can be modified are generally also applicable to the example illustrated in FIGS. 14 to 26. Still, details about features that are identical or very similar between the two examples are generally not repeated hereafter for the sake of simplicity.

FIG. 15 is a view similar to FIG. 14 once the side extensions 120 of the brush 112 are moved into a retracted position.

FIG. 16 is a longitudinal cross-sectional view of the tool 100 taken along line 16-16 in FIG. 15.

As can be seen, the second illustrated tool 100 also includes three elongated hollow outer segments, namely a proximal outer segment 140, a distal outer segment 142 and an intermediate outer segment 144. They are interconnected by two intervening hinge joints 160, 162 that break alternatively to opposite sides of the handle 104. It further includes a plurality of elongated inner segments 210, 212, 214 that are located inside the handle 104 and slidably mounted inside the outer segments 140, 142, 144. Other configurations and arrangements are possible.

FIG. 16A is an enlarged fragmentary view of the first hinge joint 160 in FIG. 16. FIG. 16B is an enlarged fragmentary view of the second hinge joint 162 in FIG. 16.

The hinge joint 160 of the second illustrated example includes a reinforcement sleeve portion 164 that is rigidly attached or molded at one end of the proximal outer segment 140, more particularly the end that is opposite to its proximal end 150. Only about one half of the sleeve portion 164 is mounted directly around the proximal outer segment 140. The other half extends beyond the end of the proximal outer segment 140 and over the adjacent end on the intermediate outer segment 144. The sleeve portion 164 is one of the parts of the hinge joint 160 that supports a transversally disposed pivot pin 166. The pivot pin 166 has opposite ends that are mounted into openings provided on the sleeve portion 164. The center of the pivot pin 166 passes through a channel made across a side extension portion 168. The extension portion 168 is attached or molded along a corresponding edge at the adjacent end of the intermediate outer segment 144. Other configurations and arrangements are possible.

As aforesaid, the hinge joint 162 of the illustrated example includes a sleeve portion 170. This sleeve portion 170 can be rigidly attached or molded at another end of the intermediate outer segment 144. Only about one half of the sleeve portion 170 is mounted directly around the intermediate outer segment 144. The other half extends beyond the end of the intermediate outer segment 144 and over the adjacent end of the distal outer segment 142. The sleeve portion 170 is one of the parts of the hinge joint 162 that supports a transversally disposed pivot pin 172. The two pivot pins 166, 172 are substantially parallel to one another. The pivot pin 172 has opposite ends that are mounted into openings provided on the sleeve portion 170. The center of the pivot pin 172 passes through a channel made across a side extension portion 174. The extension portion 174 is attached or molded along a corresponding edge at the adjacent end of the distal outer segment 142, more particularly the end that is opposite to the distal end 152. Other configurations and arrangements are possible. Among other things, at least some of these features can be omitted in some implementations. Other variants are possible as well.

The pivot pins 166, 172 are also on either the top or the bottom edge of the outer segments 140, 142, 144. This configuration allows folding the intermediate outer segment 144 under the proximal outer segment 140, and also the distal outer segment 142 under the intermediate outer segment 144. Other configurations and arrangements are possible.

If desired, one can also mount the respective pivot pins 166, 172 of the hinge joints 160, 162 into corresponding openings that have a slightly oblong shape or that are otherwise not perfectly circular in cross-section. The pivot pins 166, 172 can also be fitted into oversized circular openings. Such arrangement will still allow pivoting the sections of the handle 104 when the tool 100 is folded but it will prevent stresses from being immediately applied to the hinge joints 160, 162 as soon as the handle 104 is subjected to flexion. This design feature can be implemented in a number of different ways, depending on the requirements, but can also be omitted entirely.

Figure 16C:
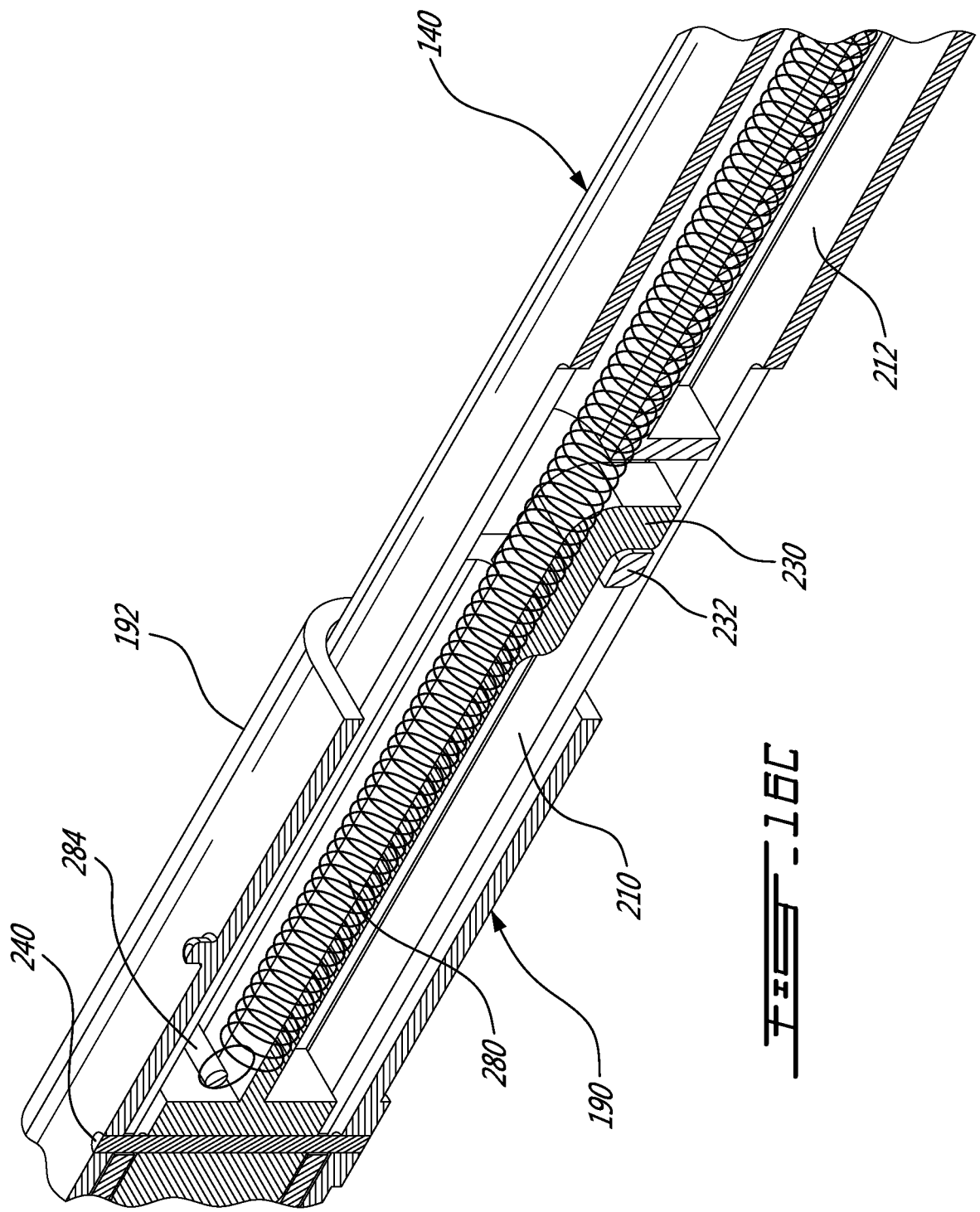
FIG. 16C is an enlarged cross-sectional view of the proximal section of the handle in FIG. 16.
Figure 16D:
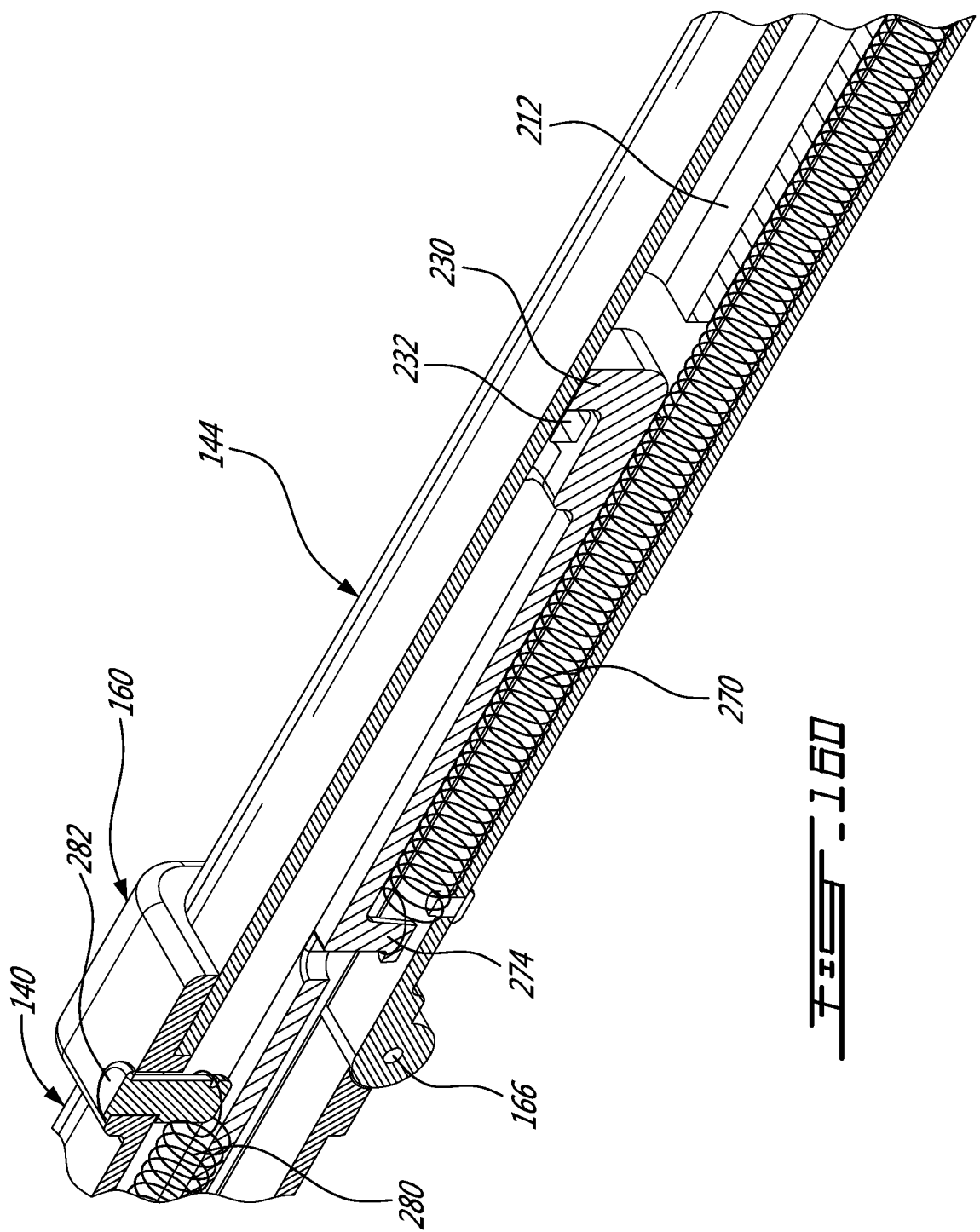
FIG. 16D is an enlarged cross-sectional view of the intermediate section of the handle in FIG. 16.

FIG. 16C is an enlarged cross-sectional view of the proximal section of the handle 104 in FIG. 16. FIG. 16D is an enlarged cross-sectional view of the intermediate section of the handle 104 in FIG. 16. FIG. 16E is an enlarged cross-sectional view of the distal section of the handle 104 in FIG. 16.

The tool 100 in the second example includes a plurality of biasing elements to create a return force between the outer segments 140, 142, 144 and the inner segments 210, 212, 214. These biasing elements are in the form of helical springs in the illustrated implementation. Other configurations and arrangements are possible. Among other things, one can use a different configuration of parts or use biasing elements that are not springs, such as elastics or the like. Still, one could also omit at least one or even all of the biasing elements in some implementations. They can be replaced by one or more other features to maintain the inner segments 210, 212, 214 in position, or have no substitute feature at all. Other variants are possible as well.

In the implementation, the first spring 260 is located inside the cavity of the distal outer segment 142 and extends along the distal inner segment 212. The first spring 260 has a first end attached to a pin 262 (see for instance FIG. 16E) provided on one of the walls of the distal outer segment 142 near the distal end 152, and a second end attached to a pin 264 (see for instance FIG. 16E) extending inwards somewhere along the interior of the shank of the distal inner segment 212. The spring 260 is in an extended position in FIG. 16E. This figure also shows that the distal outer segment 142 can include a stopper 310 therein. The illustrated stopper 310 is engaged by a rear end of the distal inner segment 212 when the handle 104 is in its stretched configuration. The second spring 270 is located inside the cavity of the intermediate outer segment 144 and extends along the intermediate inner segment 214. The spring 270 can have a rear end attached to a pin 272 (see for instance FIGS. 16B and 16E) extending inside the intermediate outer segment 144, and a front end attached to a pin 274 (see for instance FIGS. 16A and 16D) extending downwards somewhere along the shank of the intermediate inner segment 214. The spring 270 is in an extended position in FIG. 16D. The third of the biasing elements of the illustrated example also includes a spring 280. The spring 280 is located inside the cavity of the proximal outer segment 140. The spring 280 has a rear end attached to a pin 282 (see for instance FIG. 16A) extending inwards somewhere along the interior of the shank of the proximal inner segment 210, and a front end attached to the linking member 240, for instance by a pin 284 (see for instance FIG. 16C). The spring 280 is in an extended position in FIG. 16C. Other configurations and arrangements are possible. Among other things, at least some of the pins can be replaced by other features or be entirely omitted in some implementations. Other variants are possible as well.

FIG. 17 is an enlarged transversal cross-sectional view of the tool 100 taken along line 17-17 in FIG. 15.

An ice scraper 180 is attached to one side of the distal outer segment 142, near the distal end 152 thereof. This feature can be omitted in some implementations.

The head assembly 102 is also operatively attached to the handle 104 through a linkage assembly 190 in the example. The linkage assembly 190 includes a sleeve member 192 mounted around the proximal outer segment 140 of the handle 104. The linkage assembly 190 also includes a hinge joint 194 pivotally connecting the sleeve member 192 to the rear side of the main body 110. Other configurations and arrangements are possible.

FIG. 18 is an isometric view of the tool 100 shown in FIG. 15 once the head assembly 102 is pivoted to its folded back position with reference to the handle 104. The handle 104 is still in a stretched configuration in FIG. 18 and the outer segments 140, 142, 144 are still prevented from being pivoted around the hinge joints 160, 162.

FIG. 19 is a longitudinal cross-sectional view of the tool 100 taken along line 19-19 in FIG. 18.

FIG. 20 is an isometric view of the tool 100 shown in FIG. 18 once the proximal outer segment 140 is sled, with reference to the sleeve member 192, from its extended position to its retracted position.

This moved the proximal end 150 of the proximal outer segment 140 away from the sleeve member 192, and the proximal outer segment 140 is now extending entirely behind the head assembly 102 in the illustrated example. Variants are possible as well.

Figure 21:
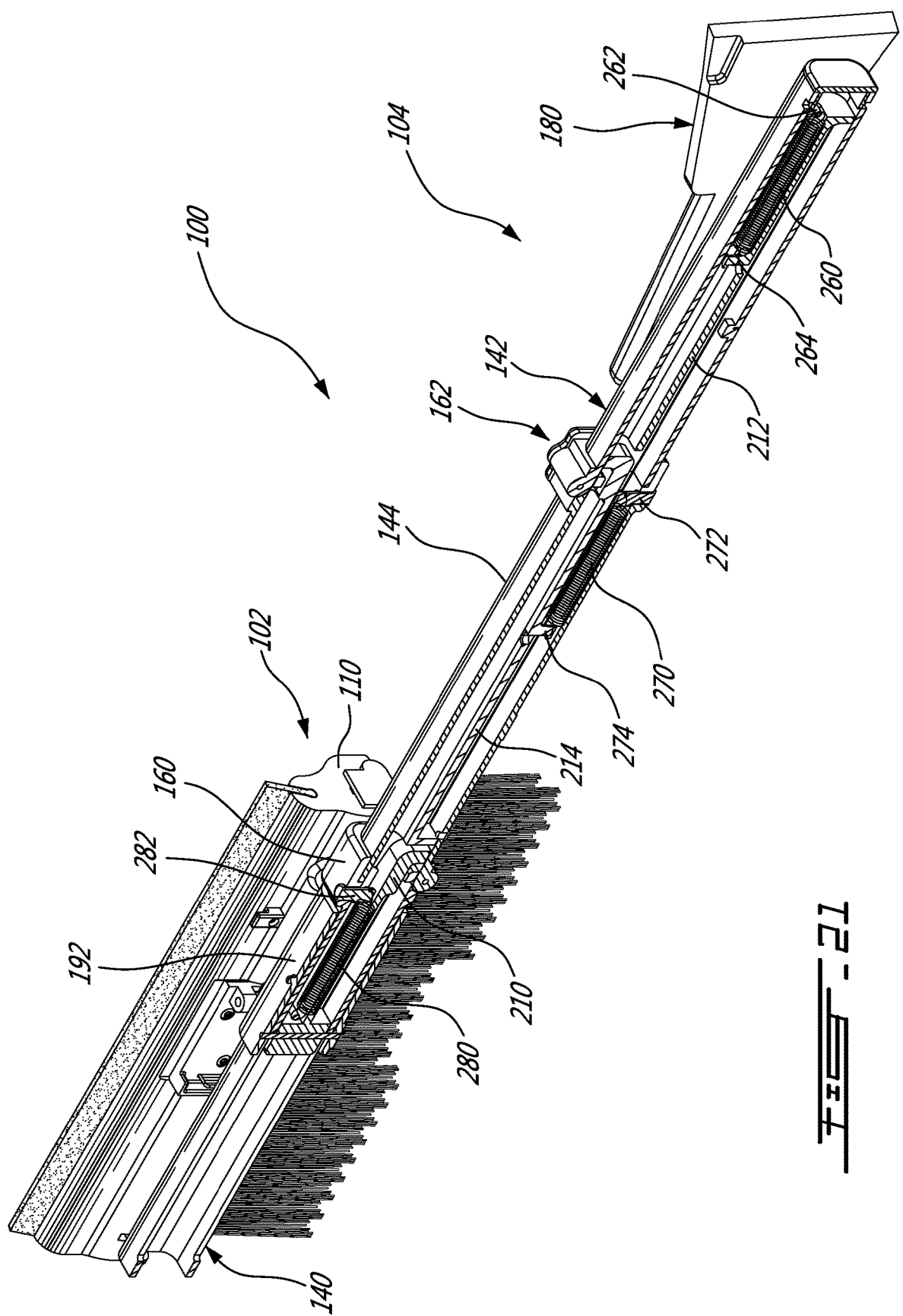
FIG. 21 is a longitudinal cross-sectional view of the tool taken along line 21-21 in FIG. 20.

FIG. 21 is a longitudinal cross-sectional view of the tool 100 taken along line 21-21 in FIG. 20. As can be seen, the relative position of the inner segments 210, 212, 214 with reference to the outer segments 140, 142, 144 are now different from what is shown in FIGS. 16 and 19.

FIG. 21 also illustrates the position of the parts when the user no longer holds the head assembly 102 with reference to the handle 104 and lets the springs 260, 270, 280 create a relative movement between the outer segments 140, 142, 144 and the inner segments 210, 212, 214 of the handle 104. In other words, in the illustrated example, the position shown in FIG. 19 is only possible when the user exerts a pulling force acting against the forces from the extended springs 260, 270, 280.

In FIG. 21, the inner segments 210, 212, 214 of the illustrated example are now substantially entirely within a corresponding one of the outer segments 140, 142, 144. The complementary end members 230, 232 are also now in registry with the junctions between the pairs of adjacent outer segments 140, 142, 144.

Figure 22:
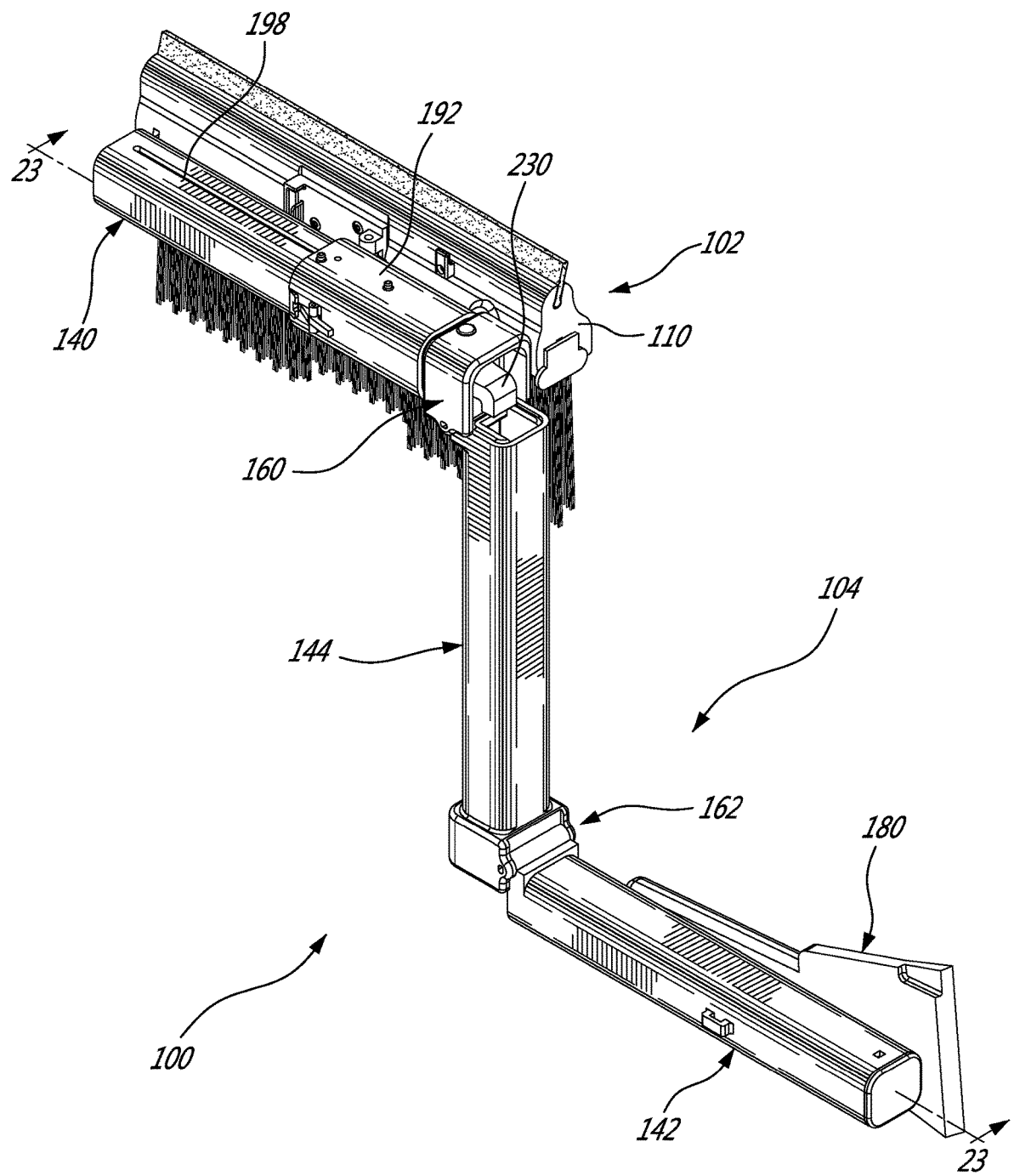
FIG. 22 is an isometric view of the tool shown in FIG. 20 once the outer segments are pivoted with reference to one another to move the handle towards its collapsed configuration.
Figure 23:
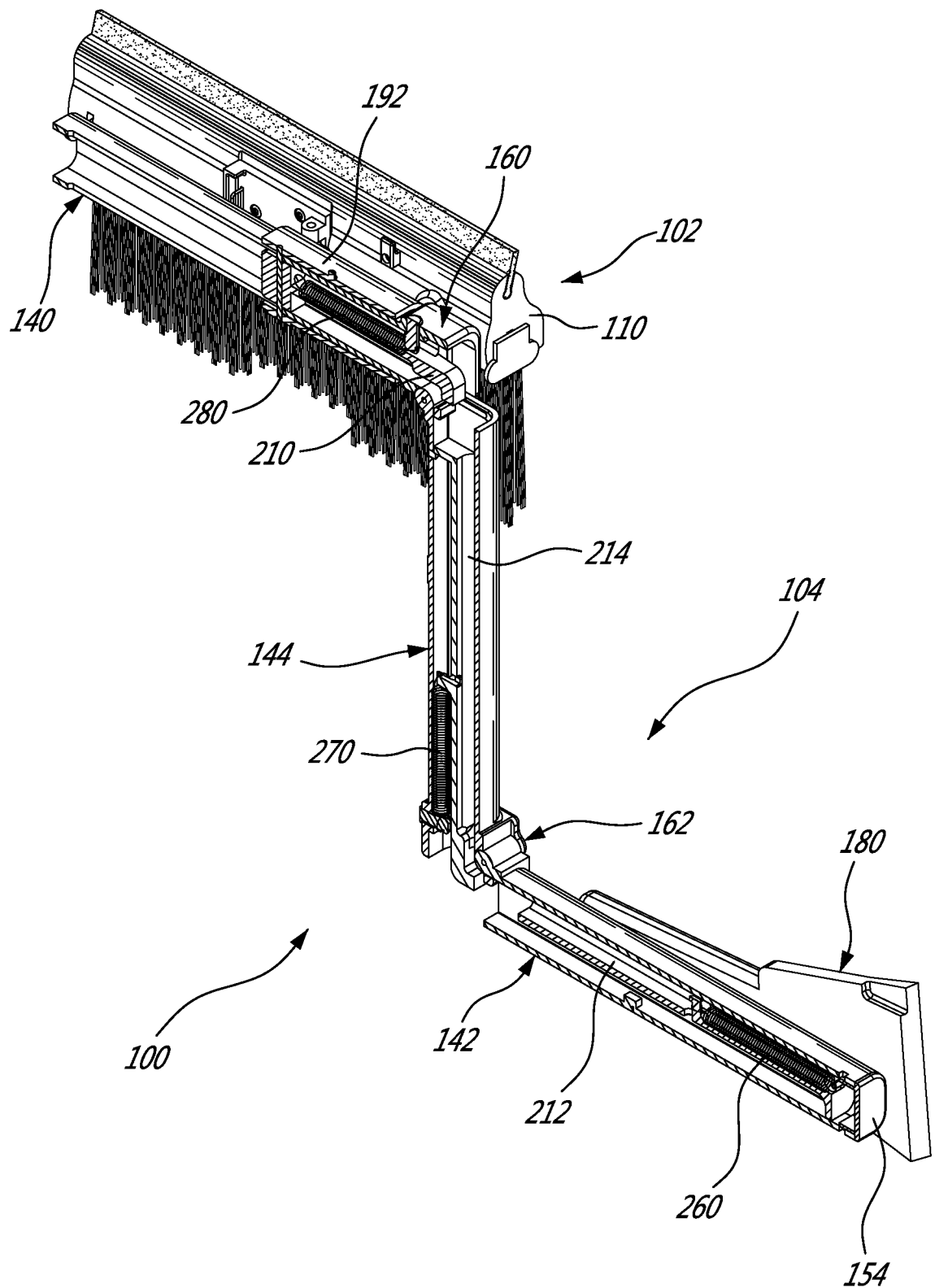
FIG. 23 is a longitudinal cross-sectional view of the tool taken along line 23-23 in FIG. 22.

FIG. 22 is an isometric view of the tool 100 shown in FIG. 20 once the outer segments 140, 142, 144 are pivoted with reference to one another to move the handle 104 towards its collapsed configuration. The handle 104 is not in its collapsed configuration yet and FIG. 22 is only an intermediate position shown for the sake of illustration. FIG. 23 is a longitudinal cross-sectional view of the tool 100 taken along line 23-23 in FIG. 22.

The intermediate inner segment 214 inside the intermediate outer segment 144 is set vertically. However, it remains within the intermediate outer segment 144 since its rear end abuts against a stopper inside the intermediate outer segment 144. This stopper is configured and disposed not to interfere with the relative movement with reference to the distal inner segment 212 when the handle 104 will be set back to its stretched configuration. The intermediate inner segment 214 is prevented from falling through the opposite open end of the intermediate outer segment 144 due to the spring 270. The distal inner segment 212 is also prevented from falling through the open end of the distal outer segment 142 due to the spring 260 and the cap 154 blocks the opposite end. The proximal inner segment 210 is prevented from falling through the open end of the proximal outer segment 140 since it is connected to the sleeve member 192. The sleeve member 192 also prevents the proximal outer segment 140 from getting out and the spring 280 helps keep the proximal outer segment 140 in position.

Figure 24:
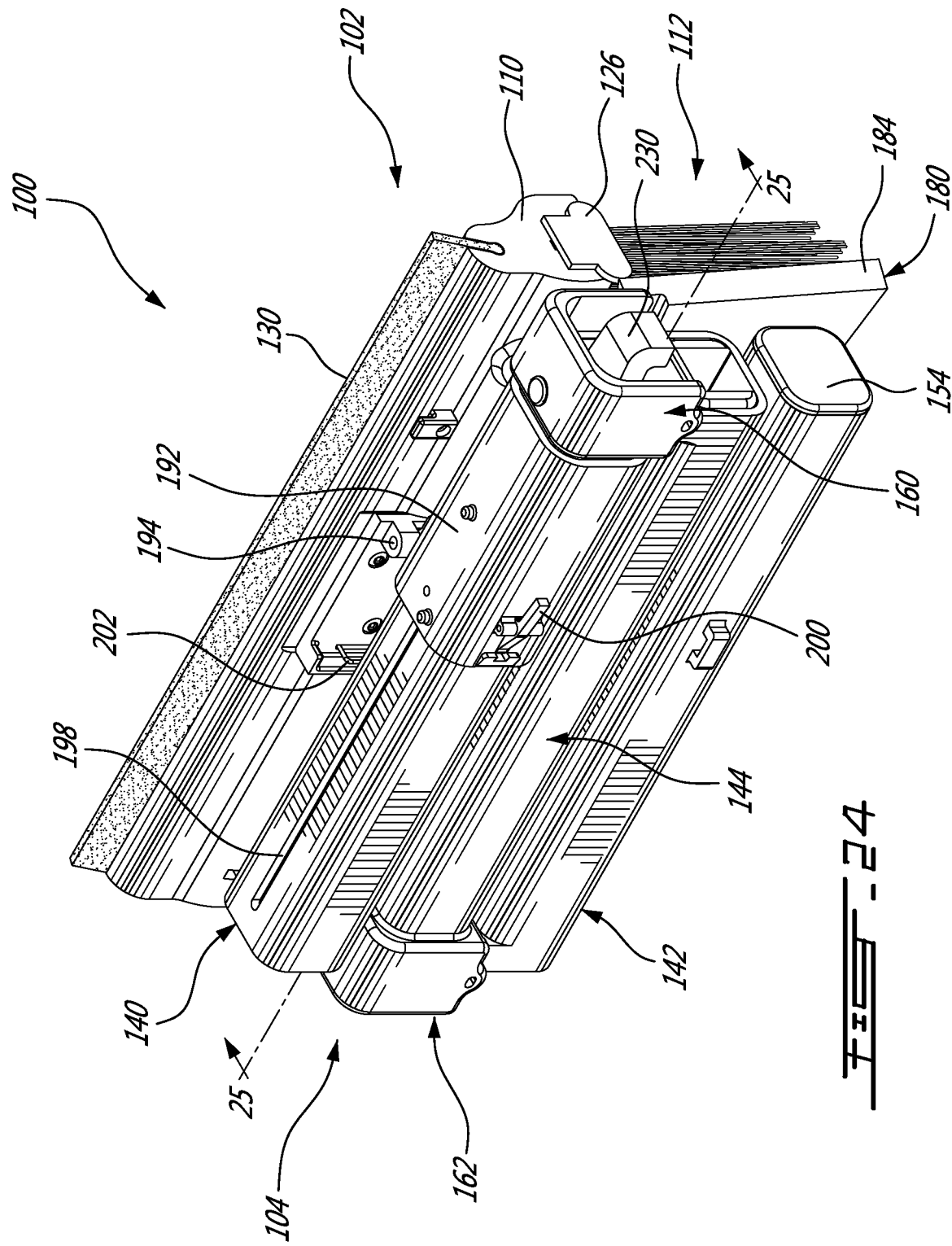
FIG. 24 is an isometric view of the tool shown in FIG. 22 once the handle is in its collapsed configuration.
Figure 25:
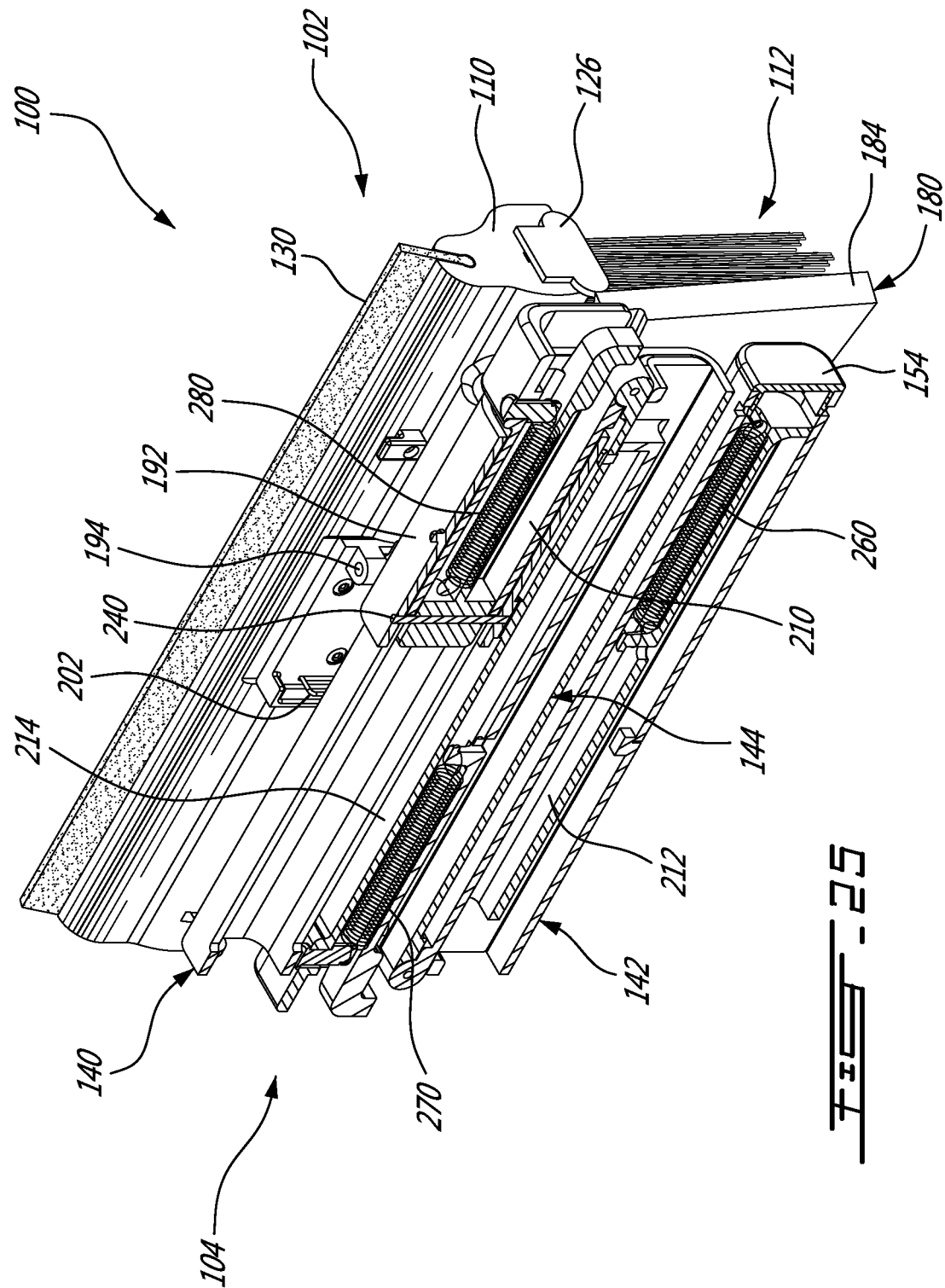
FIG. 25 is a longitudinal cross-sectional view of the tool taken along line 25-25 in FIG. 24.

FIG. 24 is an isometric view of the tool 100 shown in FIG. 22 once the handle 104 is in its collapsed configuration. FIG. 25 is a longitudinal cross-sectional view of the tool 100 taken along line 25-25 in FIG. 24. FIG. 26 is an enlarged side view of the tool 100 in FIG. 25.

As can be appreciated, the tool 100 will occupy a small and compact space once folded. It may thus be easily carried and stored when not in use. It can also be folded and unfolded with only a minimal manipulative effort and level of difficulty and the main constituent parts of the tool 100 cannot become detached. This unitary design alleviates the risks of parts being misplaced or lost.

Furthermore, the proposed concept can minimize the forces applied to the hinge joints 160, 162 when the handle 104 is in its stretched configuration. In use, the user will most likely subject the handle 104 to a combination of various types of forces, such as axial forces, torsion forces and bending forces. These forces are applied by the user on the outer segments 140, 142, 144 and more particularly on the distal outer segment 142 since this is often the location where one or even both hands of the user are positioned when the tool 100 is used for removing snow and ice on a vehicle.

Pulling for instance a large quantity of heavy wet snow may often require a significant axially pulling force by the user at the distal outer segment 142. This axial pulling force will be transmitted to the brush 112 located at the head assembly 102 to pull the snow off the vehicle. However, most of this force, if not the entire force, can bypass the hinge joints 160, 162 by transferring it to the inner segments 210, 212, 214 in the proposed tool 100.

In the example illustrated in FIGS. 1 to 13, the axial pulling forces are transferred from the distal outer segment 142 to the distal inner segment 212 through the sliding members 302 (see FIG. 13). The two sliding members 302 inside the distal outer segment 142 are located at the end of the corresponding side grooves 300 provided on respective lateral sides of the distal inner segment 212 in the first illustrated example when the handle 104 is in its stretched configuration. There is also a similar arrangement between the intermediate outer segment 144 and the intermediate inner segment 214 in the illustrated example. The sliding members 302 will abut against the rear end of the corresponding grooves 300. The inner segments 210, 212, 214 being in a linear force-transmitting engagement when the handle 104 is in the stretched configuration through the pairs of complementary end members 230, 232, the axial pulling force goes directly at the front, essentially entirely through the inner segments 210, 212, 214, and the axial forces on the hinge joints 160, 162 are then mitigated. Other configurations and arrangements are possible as well.

In the example illustrated in FIGS. 14 to 26, the axial pulling forces are transferred from the distal outer segment 142 to the distal inner segment 212 through the stopper 310 located inside the distal outer segment 142. As shown in FIG. 16E, this stopper 310 engages a flange at the rear end of the distal inner segment 212 when the handle 104 is in its stretched configuration. The axial pulling force will go directly at the front, essentially entirely through the inner segments 210, 212, 214 because of their linear force-transmitting engagement, and the axial forces on the hinge joints 160, 162 are then mitigated. Other configurations and arrangements are possible as well.

The distal inner segment 212 extends across the hinge joint 162 and the intermediate inner segment 214 extends across the hinge joint 160 when the handle 104 is in its stretched configuration. These inner segments 212, 214 are designed to fit relatively snugly inside the outer segments 140, 142, 144 and the mating parts are noncircular. The torsion forces will then be readily transmitted from the outer segments 140, 142, 144 to the inner segments 210, 212, 214. The hinge joints 160, 162 will still be subjected to some level of the torsion forces but they will not be as high. Thus, the presence of the inner segments 210, 212, 214 reinforces the handle 104 and mitigate the twisting of the handle 104 in the presence of torsion forces.

The fact that the intermediate inner segment 214 and the distal inner segment 212 extend across the hinge joints 160, 162, respectively, also greatly mitigates the forces on these hinge joints 160, 162 when bending moments are applied. The forces are amplified by the distance when the handle 104 is subjected to flexion and the hinge joints 160, 162 would require a very sturdy construction to withstand major bending forces alone. Such construction would most likely not be suitable since it would almost certainly be too heavy and cumbersome for any practical use. Having the inner segments 212, 214 across the hinge joints 160, 162, when the handle 104 is in its stretched configuration, remove most of the stresses on them during the flexion. The stresses on the hinge joints 160, 162 can also be further limited by including stress-relieve features. In the first illustrated example, this is done for instance by providing resilient hinge elements 165, 171 having a wavy shape or the like, as shown in FIGS. 3B and 3H. In the second illustrated example, the pivot pins 166, 172 of the hinge joints 160, 162 are mounted into corresponding openings that have a slightly oblong shape or that are otherwise not perfectly circular in cross-section, as can be seen for instance in FIG. 17. The pivot pins 166, 172 can also be fitted into oversized circular openings. These features can provide just enough room to mitigate stresses. Other configurations and arrangements are possible as well.

Another one of the advantages of the illustrated tool 100 is that it can be locked and unlocked using only a single latching mechanism, for instance one operated through the single finger-actuated lever 200. The lever 200 in the illustrated example includes a hook at one end that is designed to engage the edge of the holding rod 202, provided on the back side of the main body 110, in a latching relationship. This latching mechanism locks the sleeve member 192 in the perpendicular position with reference to the head assembly 102 and in a load supporting manner. Pushing on the distal side of the lever 200 will release the latching engagement and allow the head assembly 102 to pivot around the hinge joint 194 and the handle 104 to be folded. The handle 104, however, cannot be folded when the latching mechanism is engaged. Other configurations and arrangements are possible. As aforesaid, the latching mechanism can be omitted in some implementations. Other variants are possible as well.

FIGS. 27A and 27B are isometric views illustrating another example of a tool 100 in accordance with the proposed concept. The illustrated tool 100 is also a snow-removal device. As can be seen, this version of the tool 100 includes only one hinge joint 160. It does not have an intermediate outer segment and an intermediate inner segment. The proximal outer segment 140 and the distal outer segment 142 are immediately adjacent to one another, as shown in FIG. 27A, instead of being separated by an intermediary outer segment like in the previous examples. FIG. 27B shows the same tool 100 in a collapsed configuration.

In the implementation of FIGS. 27A and 27B, the tool 100 further includes a supplemental telescopic segment 340 slidably attached over the distal section of the handle 104. The telescopic segment 340 is in a sliding engagement with the exterior of the distal outer segment 142. It can be useful to extend the length of the handle 104 when needed.

The telescopic segment 340 has a hollow interior and can receive at least a large portion of the distal outer segment 142 when the handle 104 is in a collapsed configuration. It can be locked in an extended position and also in the retracted position using, for instance, an internal locking arrangement. The locking arrangement can include a V-shaped resilient member with outer ends engaging the interior of the corresponding holes made through the telescopic segment 340. FIG. 27A shows that the illustrated telescopic segment 340 includes a first hole 342 located near its proximal end, and a second hole 344 located near its distal end. Corresponding holes can also be provided on the opposite side, namely on the bottom side. The locking arrangement can be made easily releasable by the user by depressing the parts protruding from the corresponding set of holes 342, 344 and the telescopic segment 340 can then be sled.

The tool 100 of FIGS. 27A and 27B further includes a hinge joint 194 aligned with the medial widthwise position instead of being on the side of the sleeve member 192. It extends between two spaced-apart flanges 350 supporting the handle 104. The hinge joint 194 is also the linking member 240 in this implementation. The tool 100 includes at least one latching mechanism, in this case two, each having at least one single finger-actuated lever 200 provided on the sleeve member 192, for instance integrally molded therein. Each lever 200 has a cantilever construction, for instance a construction similar to those of the stop tabs 220, 226, 228. It can also include an outwardly protruding portion, as shown, to facilitate the finger actuation. The second latching mechanism is located on the bottom side of the sleeve member 192 and includes a similar finger-actuated lever. Among other things, having two latching mechanisms can enhance the solidity and can prevent the handle 104 from being inadvertently unlocked if the user depresses a lever 200 by error. Depressing only one of the two levers 200 will not allow the handle 104 to pivot with reference to the head assembly 102 since both must be depressed together in this implementation. Nevertheless, it is easy to unlock both latching mechanisms simultaneously, using a single hand, when required. The rear edges of the flanges 350 are rounded so that interferences with the outwardly protruding portions are prevented.

The tool 100 of FIGS. 27A and 27B further includes a spring-biased clip 360 provided on one side of the sleeve member 192. This clip 360 can be useful to attach the tool 100 once folded to another object, for instance the backrest of a seat in a vehicle or on the side of a console or a storage compartment. Many other possibilities exist.

It should be noted that other configurations and arrangements are possible. Among other things, the telescopic segment 340 can be provided at the distal end of the handle 104 of the tools 100 shown in the previous figures. Using one or more telescopic segments 340 over the first one is possible. The locking arrangement can be constructed differently, and in some implementations, it can be omitted. The supplemental telescopic segment 340 can be omitted, including when there is only one hinge joint 160. The number and/or the design of the latching mechanism(s) can be different. It can be possible to omit having a latching mechanism in some implementations. The position and/or the design of the clip 360 can be different in some implementations. The clip 360 can be omitted, or it can be provided on other implementations or on other kinds of tools. Other variants are possible as well.

FIGS. 28A and 28B illustrate another example of a tool 100 in accordance with the proposed concept. This illustrated tool 100 is a shovel, for instance a shovel to move snow, earth, sand, gravel or any other material. The head assembly 102 of this tool 100 includes a hand shovel blade 400. FIG. 28A shows the tool 100 in a stretched configuration and FIG. 28B shows the same tool 100 in a collapsed configuration. This tool 100 includes a handgrip 370 at the distal end of the handle 104.

The tool 100 of FIGS. 28A and 28B is an example of an implementation where the handle 104 is not pivotally attached to the head assembly 102 and where the sleeve member 192 is instead made integral with the head assembly 102. This feature can be used on other kinds of tools, including on snow-removal devices. At least one latching mechanism is provided to lock the proximal outer segment 140 in position with reference to the sleeve member 192 when the handle 104 is in the stretched configuration. There are two opposite latching mechanisms in the illustrated example. Each latching arrangement includes a spring-biased lever 200 that the user can depress to release the latching engagement, thereby allowing an additional portion of the proximal section of the handle 104 to be pushed into the sleeve member 192 so as to move the corresponding inner segments up to the point where the intervening joint 160 can be open. Other configurations and arrangements are possible. Among other things, the construction of the head assembly 102 and/or the construction of the handle 104 and/or the latching mechanism(s) of this tool 100 can be different. The handgrip 370 can be omitted in some implementations. Other variants are possible as well.

FIGS. 29A and 29B illustrate another example of a tool 100 in accordance with the proposed concept. The illustrated tool 100 is a rake, for instance a rake for loosening or smoothing a surface on the ground. The head assembly 102 of this tool 100 includes a toothed transversal bar 402. FIG. 29A shows the tool 100 in a stretched configuration and FIG. 29B shows the same tool 100 in a collapsed configuration. As can be seen, the toothed transversal bar 402 can be pivoted with reference to the handle 104 when the tool 100 is folded. Other configurations and arrangements are possible. Among other things, the construction of the head assembly 102 and/or the construction of the handle 104 and/or the attachment between them can be different. Other variants are possible as well.

The present detailed description and appended figures are only examples. A person working in the field will be able to see that variations can be made while still staying within the framework of the proposed concept. Among other things, and unless otherwise explicitly specified, none of the parts, elements, characteristics or features, or any combination thereof, should be interpreted as being necessarily essential to the invention simply because of their presence in one or more examples described, shown and/or suggested herein.

LIST OF REFERENCE NUMERALS

| | |
|---|---|
| 100 tool | 102 head assembly |
| 104 handle | 110 main body |
| 112 brush | 120 side extension |
| 122 elongated base | 124 groove |
| 126 pull tab | 130 squeegee strip |
| 132 connecting arrangement | 140 proximal outer segment |
| 142 distal outer segment | 144 intermediate outer segment |
| 146 longitudinal axis | 150 proximal end |
| 152 distal end | 154 cap |
| 160 hinge joint | 162 hinge joint |
| 164 sleeve portion | 165 hinge element |
| 166 pivot pin | 168 extension portion |
| 170 sleeve portion | 171 hinge element |
| 172 pivot pin | 174 extension portion |
| 180 ice scraper | 182 base portion |
| 184 scraping edge | 190 linkage assembly |
| 192 sleeve member | 194 hinge joint |
| 198 slideway | 200 finger-actuated lever |
| 202 holding rod | 210 proximal inner segment |
| 212 distal inner segment | 214 intermediate inner segment |
| 220 stop tab | 222 notch |
| 224 notch | 226 stop tab |
| 228 stop tab | 229 notch |
| 230 end member | 232 end member |
| 240 linking member | 250 stopper |
| 260 spring | 262 pin |
| 264 pin | 270 spring |
| 272 pin | 274 pin |
| 280 spring | 282 pin |
| 284 pin | 300 groove |
| 302 sliding member | 310 stopper |
| 320 section | 322 section |
| 324 slanted surface | 330 section |
| 332 section | 334 slanted surface |
| 340 supplemental telescopic segment | 342 first hole |
| 344 second hole | 350 flange |
| 360 clip | 370 handgrip |
| 400 shovel blade | 402 toothed transversal bar |

What is claimed is:

1. A tool configured as a snow removal device, including:
   a head assembly including a brush, said the brush including a plurality of bristles that are attached to a main body;
   an articulated handle having a stretched configuration and a collapsed configuration, the handle including:
      a proximal elongated hollow outer segment, the proximal outer segment having a proximal end and at least one longitudinally extending slideway;
      a distal elongated hollow outer segment, the distal outer segment having a distal end;
      an intervening hinge joint pivotally interconnecting the outer segments in juxtaposition, the outer segments being in alignment along a longitudinal axis when the handle is in the stretched configuration, and being folded back on one another when the handle is in the collapsed configuration; and
      a proximal and a distal elongated inner segment slidably mounted inside the outer segments, the inner segments having complementary end members that are self-interlocking in a linear force-transmitting engagement when the handle is in the stretched configuration, the inner segments being detached from one another when the handle is in the collapsed configuration; and
   a linkage assembly operatively attaching the handle to the head assembly, the linkage assembly including a sleeve member in sliding engagement with the proximal outer segment, the proximal outer segment being axially movable, with reference to the sleeve member, between at least a retracted position and an extended position, the proximal end of the proximal outer segment being further away from the sleeve member in the retracted position than in the extended position, whereby, when the proximal outer segment is in the extended position while the handle is in the stretched configuration, the interlocked complementary end members attaching the inner segments being positioned out of alignment with each junction between the outer segments.

2. The tool as defined in claim 1, wherein the linkage assembly includes a latching mechanism to selectively lock the handle in the stretched configuration and/or a linking member securing the sleeve member to the inner segment.

3. The tool as defined in claim 1, wherein the handle further includes:
   an intermediate elongated hollow outer segment interposed between the proximal outer segment and the distal outer segment;
   an additional intervening hinge joint; and
   an intermediate elongated inner segment interposed between the proximal inner segment and the distal inner segment.

4. The tool as defined in claim 3, wherein the intervening hinge joints break alternatively to opposite sides of the handle.

5. The tool as defined in claim 3, wherein the tool further includes at least one position restricting arrangement, one of the at least one position restricting arrangement including at least one resilient cantilever stop tabs provided on the intermediate outer segment and having an inwardly projecting flange selectively engaging one among two opposite notches provided on the intermediate inner segment when the handle is in the stretched configuration and engaging the other notch when the handle is in the collapsed configuration.

6. The tool as defined in claim 5, wherein one of the at least one position restricting arrangement includes at least one resilient cantilever stop tab provided on the sleeve member and having an inwardly projecting flange selectively engaging one among two opposite notches provided on the proximal outer segment when the handle is in the stretched configuration and engaging the other notch on the proximal outer segment when the handle is in the collapsed configuration.

7. The tool as defined in claim 3, wherein the tool further includes:
   a first biasing element located inside the distal outer segment, the first biasing element extending between the distal outer segment and the distal inner segment;
   a second biasing element located inside the intermediate outer segment, the second biasing element extending between the intermediate outer segment and the intermediate inner segment; and
   a third biasing element located inside the proximal outer segment, the third biasing element extending between the linking member and the proximal inner segment.

8. The tool as defined in claim 7, wherein at least one of the biasing elements includes a helical spring.

9. The tool as defined in claim 1, wherein the tool further includes at least one position restricting arrangement, one of the at least one position restricting arrangement includes at least one resilient cantilever stop tab provided on the distal outer segment and having an inwardly projecting flange selectively engaging one among two opposite notches provided on the distal inner segment when the handle is in the stretched configuration and engaging the other notch on the distal inner segment when the handle is in the collapsed configuration.

10. The tool as defined in claim 1, wherein each intervening hinge joint includes a corresponding pivot pin mounted into a stress-releasing opening, the stress-releasing opening being preferably substantially oblong.

11. The tool as defined in claim 1, wherein each intervening hinge joint includes a corresponding hinge member having two transversally disposed axes that are perpendicular to the longitudinal axis, each hinge member preferably having a wavy-shaped resilient body.

12. The tool as defined in claim 1, wherein the bristles have ends that are embedded within the main body.

13. The tool as defined in claim 12, wherein the brush includes at least one side extension having bristles and that is slidably mounted on the main body.

14. The tool as defined in claim 1, wherein the head assembly includes a squeegee strip, and/or the handle includes an ice scraper, the ice scraper preferably being attached along the distal outer segment and including a scraping edge extending beyond the distal end.

15. The tool as defined in claim 1, wherein the tool includes a hinge joint pivotally connecting the sleeve member to the head assembly, the sleeve member being pivotable between at least a folded back position and a projecting position when the proximal outer segment is in the extended position.

16. The tool as defined in claim 1, wherein at least the distal outer segment and the distal inner segment include pairs of longitudinally extending grooves and sliding members cooperating to transfer a pulling force applied on the distal outer segment to the distal inner segment when the handle is in the stretched configuration, thereby mitigating axial forces on the hinge joints.

17. The tool as defined in claim 1, wherein at least the distal outer segment includes a stopper engaging a rear end of the distal inner segment to transfer a pulling force applied on the distal outer segment to the distal inner segment when the handle is in the stretched configuration, thereby mitigating axial forces on the hinge joint or joints.

18. The tool as defined in claim 1, further including a supplemental telescopic segment slidably attached over the distal section of the handle.

19. The tool as defined in claim 1, wherein the tool is configured as a snow-removal device and the head assembly includes a brush.

20. The tool as defined in claim 1, wherein the tool includes one of the following features:
   the tool is configured as a shovel and the head assembly includes a shovel blade;
   the tool is configured as a rake and the head assembly includes a toothed transversal bar.

* * * * *